US012400187B2

(12) United States Patent
Westerheide et al.

(10) Patent No.: US 12,400,187 B2
(45) Date of Patent: Aug. 26, 2025

(54) THREE-PARTY RECRUITING AND MATCHING PROCESS INVOLVING A CANDIDATE, REFERRER, AND HIRING ENTITY

(71) Applicant: TALINITY, INC., Tampa, FL (US)

(72) Inventors: Theodore J. Westerheide, Tampa, FL (US); David A. Mayer, Los Angeles, CA (US); Wayne H. Levy, Evanston, IL (US); Paul B. Mayer, Kailua, HI (US); Yingyu Fu, New York, NY (US); Oleg Popivnenko, Kharkov (UA)

(73) Assignee: Talinity, Inc., Tampa, FL (US)

( * ) Notice: Subject to any disclaimer, the term of this patent is extended or adjusted under 35 U.S.C. 154(b) by 66 days.

(21) Appl. No.: 17/411,694

(22) Filed: Aug. 25, 2021

(65) Prior Publication Data

US 2022/0067665 A1  Mar. 3, 2022

Related U.S. Application Data

(60) Provisional application No. 63/070,665, filed on Aug. 26, 2020.

(51) Int. Cl.
*G06Q 10/1053* (2023.01)
*G06N 20/00* (2019.01)
(Continued)

(52) U.S. Cl.
CPC ......... *G06Q 10/1053* (2013.01); *G06N 20/00* (2019.01); *G06Q 10/063112* (2013.01); *G06Q 50/01* (2013.01)

(58) Field of Classification Search
CPC .......... G06N 20/00; G06N 3/08; G06N 5/022; G06N 5/048; G06Q 10/1053;
(Continued)

(56) References Cited

U.S. PATENT DOCUMENTS

2011/0276631 A1* 11/2011 Schmitt ................. G06Q 50/01
709/205
2012/0330708 A1  12/2012 Khan
(Continued)

OTHER PUBLICATIONS

International Search Report and Written Opinion for International Application No. PCT/US2021/047562, International Filing Date Aug. 25, 2021, Date of Mailing Dec. 28, 2021, 13 pages.

*Primary Examiner* — Avia Salman
(74) *Attorney, Agent, or Firm* — Dickinson Wright PLLC; Jonathan H. Harder

(57) ABSTRACT

In one embodiment, a method includes determining a job match between a candidate and a job posted by a hiring entity, providing the job match for presentation on a computing device of a referrer, receiving, from the computing device of the referrer, a selection to share the job match with the candidate, transmitting, to the candidate, a message comprising the job match and information pertaining to the referrer, receiving, from the candidate, an acceptance for the referrer to recommend the candidate to the hiring entity for the job, transmitting, to the computing device of the hiring entity, a recommendation for the candidate on behalf of the referrer, receiving, from the hiring entity, a selection of the candidate to apply for the job, wherein the selection is based on the recommendation, and transmitting, to the computing device of the candidate, an invitation to interview for the job.

18 Claims, 33 Drawing Sheets

(51) Int. Cl.
*G06Q 10/0631* (2023.01)
*G06Q 50/00* (2024.01)

(58) Field of Classification Search
CPC ........... G06Q 10/063112; G06Q 50/01; G06Q 30/018; G06Q 10/105; G06Q 10/10; G06Q 10/1097; G06Q 10/1093; G06Q 10/06; G06Q 10/0631; G06Q 10/06311; G06Q 10/063114; G06Q 10/063116; G06Q 10/063118; G06Q 50/2057; G06Q 10/06398; G06Q 10/06393; G06F 16/285; G06F 16/24578; G06F 16/9574
USPC ........................................................ 705/321
See application file for complete search history.

(56) References Cited

U.S. PATENT DOCUMENTS

| | | | |
|---|---|---|---|
| 2014/0358810 A1 | 12/2014 | Hardtke et al. | |
| 2015/0006422 A1* | 1/2015 | Carter | G06Q 10/1053 |
| | | | 705/321 |
| 2017/0032322 A1* | 2/2017 | Grover | G06Q 10/1053 |
| 2018/0005163 A1* | 1/2018 | Ramo | G06Q 10/1053 |
| 2018/0300689 A1* | 10/2018 | Miller | G06Q 10/1053 |
| 2018/0308062 A1* | 10/2018 | Quitmeyer | G06Q 10/1053 |
| 2019/0164108 A1 | 5/2019 | Chimka et al. | |
| 2019/0164133 A1* | 5/2019 | Chakraborty | G06N 20/00 |
| 2019/0197486 A1* | 6/2019 | Jersin | G06F 16/735 |
| 2019/0251516 A1* | 8/2019 | Champaneria | G06Q 10/1053 |
| 2019/0370669 A1* | 12/2019 | Pais | G06F 16/90335 |
| 2020/0226532 A1* | 7/2020 | Lazarus | G06Q 10/063112 |

* cited by examiner

500

RW

Rajnish Wang
Senior Manager International Quality and Regulatory Affairs, DSM Sinoche Pharmaceuticals
✉ rajnishwang@sinochem.com

[ Invite to Talinity ]

---

Rajnish Wang matches 45 jobs on Talinity! | $3,113 Your reward

Senior Product Manager
🏢 Alaska Oral Surgery Center
📍 Tulsa, OK

Eius ipsam doloromequ accustiona et vel Explicab uam prepuandse volup cim soluta. Ab quia alquid dolorum Perciptas saep nisi. Derseruht labore assumenda sum quis nobis sunt placeat majores. Senior Product Manager

[ Share Job ]

---

Contacts
< ▼ Everyone

Everyone
Members
Invitation Suggestions

🔍 Search Contacts

- ☐ Aaron Spivey xxxxxxxxxxxxxxxxxxxxxx
- ☐ Aaron Yee xxxxxxxxxxxxxxxxxxxxxx — [1 job match] 📞
- ☐ Aaron Zajicek xxxxxxxxxxxxxxxxxxxxxxxxxxxxxxx — [21 job matches]
- ☐ Aairti Bylani xxxxxxxxxxxxxxxxxxxxxxxxxxxxx — [19 job matches]
- ☐ Ab Shaheen xxxxxxxxxxxxxxxxxxxxxxxxx — [17 job matches]
- ☐ Abam Mambo-doh xxxxxxxxxxxxxxxxxxxxxxxxxxxxxxxxxx
- ☐ Abbie Herrick xxxxxxxxxxxxxxxxxxxxxxxxxxxxxxx 📞
- ☐ Abbigail Borkowski xxxxxxxxxxxxxxxxxxxxxxxxx — [1 job match]
- ☐ Abby Johnson xxxxxxxxxxxxxxxxxxxxxxxxx — [25 job matches]
- ☐ Abdalla Alafifi xxxxxxxxxxxxxxxxxxxxxxxxx — [29 job matches]
- ☐ Abdul Jetawi xxxxxxxxxxxxxxxxxxxxxxxxx — [17 job matches]
- ☐ Abdullah Alsaqbhi xxxxxxxxxxxxxxxxxxxxxxxxx — [17 job matches] 📞
- ☐ Abdullah Awamish xxxxxxxxxxxxxxxxxxxxxxxxx — [28 job matches]
- ☐ Abe Wischnia xxxxxxxxxxxxxxxxxxxxxxxxx — [24 job matches] 📞
- ☐ Abhay Flores xxxxxxxxxxxxxxxxxxxxxxxxx — [27 job matches]

FIG. 5

Hello Jennifer,

Welcome to Talinity.

A professional community where Members 'pay it forward' by personally helping friends and colleagues land the perfect job.

[ ○ ABC ]   [ ▷ XYX ]

( Who we are in 30 seconds  ▶ )

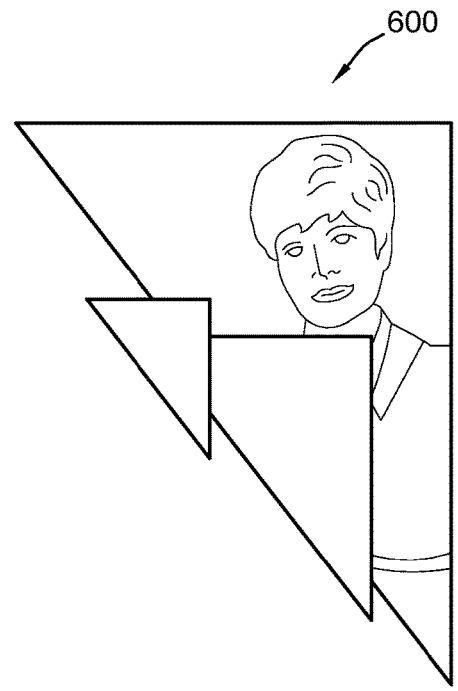

Set Up Your Company

Set up your company details and payment information. This is required for publishing job requisitions. Note: requires payment information.

[ Set Up Company ]

Invite Your Employees

Invite your employees to Talinity. This give you a stronger network of candidates to pull from, and greatly increases your chances of finding the perfect match.

[ Invite Employees ]

Create Your First Job Requisition

Create and publish your first Talinity job requisition and start finding the perfect candidate in record time. You'll need to have your company set up before you can publish.

[ Create Your Job Requisition ]

Become a member and refer your friends!

As a hiring manager, you can also use Talinity as a member, referring your friends and colleagues to positions and earning rewards for your referrals.

To set up your member account, simply click the person icon in the upper right hand corner.

| You've earned: | $1,240 |

My Profile        ●▬ 80% Complete

Basic Information

Work History and Education

Skills and Experience

*FIG. 6*

Hiring Manager Setup

▼ Invite Your Employees To Join

Talinity works best with more talent available. Add your employees, so they can help recruit amazing candidates from their networks.

Upload a .csv file

[ Browse ]

File should contain at least one column with email addresses

[ Back ]     [ Upload & Continue ]

Hiring Manager Setup
◥ Invite Your Employees To Join

800

1,245 Contacts Imported

🔍 Search contacts

☑▾ Select All On Page    1-15 of 700 ◁ ▷

☑ jdoe@gmail.com
☑ jdoe@gmail.com
☑ jdoe@gmail.com
☑ jdoe@gmail.com
☑ jdoe@gmail.com
☑ jdoe@gmail.com
☑ jdoe@gmail.com
☑ jdoe@gmail.com
☑ jdoe@gmail.com
☑ jdoe@gmail.com
☑ jdoe@gmail.com
☑ jdoe@gmail.com
☑ jdoe@gmail.com Choose Message Template

Polite    Formal    Upbeat

Your Message

I thought you'd like to join Talinity. It's a free, Hire By Referral business community where our Members actively 'Pay it Forward and Get Rewarded' by helping friends and colleagues land the perfect job.

Send Invites

*FIG. 8*

Personality Characteristics

| Personality Characteristic | Level | |
|---|---|---|
| Innovative | High | Edit |
| Driven | Medium | Edit |
| Good Team Player | Medium | Edit |

[+ Add another personality characteristic]

Education & Work

Degree Preference

[None ▶]

School Preferences

[Purdue University ×] [Harvard University ×]

☑ Filter out applicants who haven't attended one of these schools

Previous Company Experience

[Coca-Cola ×] [Google ×]

☐ Filter out applicants who haven't worked at one these companies

---

Talinity Predict

How we expect your job to do, based on the factors you've set. ▶

387
Candidates

71 ▶ Referrals
62 ▶ Applications
15 ▶ Interviews
11    Possible Acceptances

[ Recalculate ]

*FIG. 10*

◥ Preview Candidate Matches

Based on the criteria you've entered into the job requisition, these are some matches from the Talinity network. Note that matches are anonymized until Champions begin referring them to you.

☑ Include Champion referral strength in score

---

Sales Representative
◉ Atlanta, WA

[Sales Engineering] [Sales] [Goals] [Social Sales] [Technology] [Lead Qualification]
[Marketing] [Prospecting] +4 more 97 / 1
Score / Rank View profile ▶

---

Sales Engineer
◉ Atlanta, WA

[Sales Engineering] [Sales] [Goals] [Social Sales] [Technology] [Lead Qualification]
[Marketing] [Prospecting] +4 more 95 / 2
Score / Rank View profile ▶

---

Sales Rep
◉ Atlanta, WA

[Sales Engineering] [Sales] [Goals] [Social Sales] [Technology] [Lead Qualification]
[Marketing] [Prospecting] +4 more 94 / 3
Score / Rank View profile ▶

*FIG. 12*

My Jobs

⌕ New candidates have been referred!

Create New Job

Sales Representative
◉ Tampa, FL

The Evofem Sales Representative is a professional in the healthcare industry who is responsible for meeting and exceeding product sales goals and management of physician relationships within a specific geography. The Sales Representative must demonstrate a strong understanding of ....

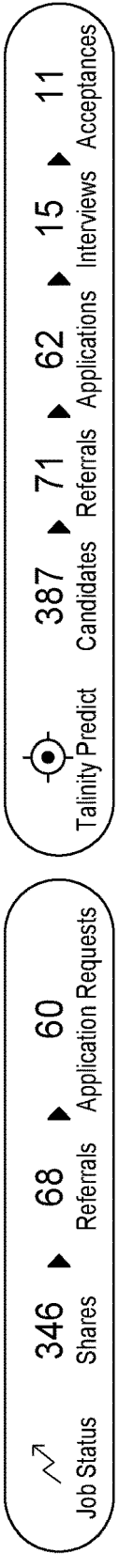

↗ Job Status | 346 ▲ Shares | 68 ▲ Referrals | 60 ▲ Application Requests | ⊙ Talinity Predict | 387 ▲ Candidates | 71 ▲ Referrals | 62 ▲ Applications | 15 ▲ Interviews | 11 ▲ Acceptances View all Referred Candidates ▶

Sales Advisor
◉ Tampa, FL

At Office Sales and Office Supplies, the Sales Advisor is a part-time role, providing exceptional customer service by performing duties as cashier, provides logistics support, stocking, restocking, down stocking, inventory control, cleaning the store and protecting company assets. S/he will quickly ....

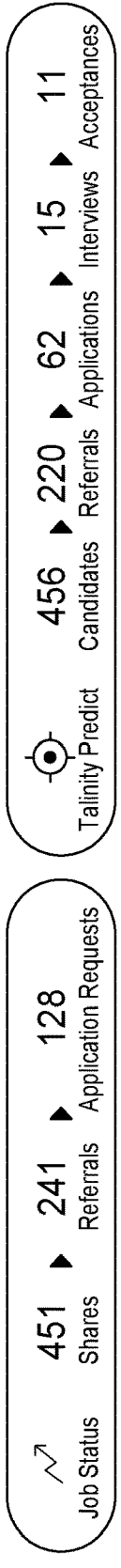

↗ Job Status | 451 ▲ Shares | 241 ▲ Referrals | 128 ▲ Application Requests | ⊙ Talinity Predict | 456 ▲ Candidates | 220 ▲ Referrals | 62 ▲ Applications | 15 ▲ Interviews | 11 ▲ Acceptances View all Referred Candidates ▶

*FIG. 13*

◀ Back to my jobs

Referrals for this job

1400

Sales Representative

☐ Syneos Health  ⊙ Tampa, FL

$1,650 Your reward

---

Job Description

The Evofem Sales Representative is a professional in the healthcare industry who is responsible for meeting and exceeding product sales goals and management of physician relationships within a specific geography. The Sales Representative must demonstrate a strong understanding of necessary disease states and possess a solid ability to communicate necessary technical, scientific, product and disease management information to customers. The Sales Representative will provide the most current information pertaining to Evofem products and their approved indications in accordance with current Evofem Compliance Guidelines which will ensure the appropriate use of these products and achieve the business potential with each respective territory.

Responsibilities

Clinical Selling/Account Management
• Ability to engage in complex clinical discussions with target customers to achieve performance objectives
• Ability to learn and retain clinical and scientific information - engaging in sensitive women's anatomical discussions
• Build and maintain strong relationships with key customers across multiple settings

---

Justin Davis — 87 / Score — 1 / Rank
☐ Sales  ⊙ Tampa, FL
[Sales Engineering] [Sales] [Account Management]
[Outside Sales] [+4 more]
View profile ▲

Mollie Bradford — 84 / Score — 2 / Rank
☐ Sales  ⊙ Tampa, FL
[Sales Engineering] [Sales] [Account Management]
[Outside Sales] [+4 more]
View profile ▲

Bryan Herren — 81 / Score — 3 / Rank
☐ Sales  ⊙ Tampa, FL
[Sales Engineering] [Sales] [Account Management]
[Outside Sales] [+4 more]
View profile ▲

Heather Leanne — 80 / Score — 4 / Rank
☐ Sales  ⊙ Tampa, FL
[Sales Engineering] [Sales] [Account Management]
[Outside Sales] [+4 more]
View profile ▲

Hi Jennifer,

I found a job on Talinity that I thought you might be interested in.

Talinity is a hire by referral community, where you can get a great job through your network, or help your friends and family get the perfect job by writing them a referral. And when a hire is completed, both the person who is hired and the person who referred them gets a reward of $500+!

Based on your experience, you may have someone in your network who would be a great candidate for this role. Or maybe you're interested, in which case I'd be happy to write you a referral.

Click the link below to learn more about the role, and others like it, at Talinity.

| User Experience Designer | | $500 |
| --- | --- | --- |
| Sahara | Atlanta, GA | Your reward |

The User Experience Designer works hand in hand, often pairing, with other members of product teams to bring products to life.
The User Experience Designer is responsible for designing intuitive, quality products through collaboration with end users and modern software ...

Learn More

*FIG. 17*

User Experience Designer

◻ Sahara  ⊚ Atlanta, GA

$500
Your reward

Job Description
───────────

The User Experience Designer works hand in hand, often pairing, with other members of product teams to bring products to life.

The User Experience Designer is responsible for designing intuitive, quality products through collaboration with end users and modern software development teams. User Experience Designers work directly with end users to collect and analyze quantitative and qualitative data through formal research. This information is used to inform product-related hypotheses, recommendations, and ultimately user stories in the product backlog.

As a User Experience Designer you will be part of a team with more experienced team members to help build and grow your skills.

Major Tasks, Responsibilities And Key Accountabilities

20% - Planning & Analysis:
Communicates with key user and operational groups to understand business needs
Elicits ideas and assists team members with gaining shared understanding, and aligns the product team and stakeholders
Presents design concepts, user needs, and design rationale to multidisciplinary teams, as well as to key stakeholders and business partners 80% - Delivery & Execution:
Analyzes user experience data and provides recommendations to address business needs
Documents, reviews and ensures that all quality and change control standards are met
Collaborates and pairs with other product team members (UX, engineering, and product management) to design solutions
Creates designs such that information is easy to find, consume, and understand
Communicates ideas and designs to end user and product team members
Participates in and contributes to learning activities around modern software design and development core practices (communities of practice)

───────────

Are your interested in this job?

⌄  I want to get referred for this job!        I want to refer friends for this job!

Setup Your Talinity Account

To get the most out of Talinity you'll need to:
1. Create Your Profile
2. Build Your Private Network We can automatically handle a lot of this setup for you!

Legend:
- ⊙ = Automatic
- ■ = Manual

| | Upload LinkedIn Data (Recommended) | Upload Your Resume | Setup Manually |
|---|---|---|---|
| Your Profile — Your Profile must be completed in order to match to jobs and to refer friends for jobs | ⊙ | ⊙ | ■ |
| Your Private Network — You'll refer and be referred by the contacts in your Private Network | ⊙ | ■ | ■ |
| Match My Contacts — Using your LinkedIn data, we can suggest jobs for you to share with your contacts | ⊙ | ■ | ■ |
| Suggest Referral Requests — Using your LinkIn data, we can suggest contacts to request referrals for each job you match | ⊙ | ■ | ■ |
| | Email me Instructions | Upload Resume | Setup Manually |

FIG. 19

▼ Upload LinkedIn Data

Drag and drop your LinkedIn file(s) below

ⓘ It's easiest to upload your whole .ZIP file. Or if you prefer, you can select all or some of the .CSV files. Don't worry, no matter what you choose, we'll only upload the six files listed on the left.

Connections.csv
Education.csv
Positions.csv
Profile.csv
Skills.csv
Contacts.csv
(You may not have this file)

Drag and Drop your file(s) here or

Browse

Upload

Back

These friends can recommend you (3)

Justin Davis
UX Designer at Sahara

Request Sent!

Birdie Obrien
UX Designer at FishTank

Request Recommendation

Sue Wheeler
Graphic Designer at Paaath

Request Recommendation

Show contacts who could recommend you ◀

Sandra Davilla
User Experience Designer at Beech

Request Recommendation

---

User Experience Designer

🏢 The Home Depot  ⦿ Atlanta, GA

$1,650
Your reward

Job Description

The User Experience Designer works hand in hand, often pairing, with other members of product teams to bring products to life.

The User Experience Designer is responsible for designing intuitive, quality products through collaboration with end users and modern software developments teams. User Experience Designers work directly with end users to collect and analyze quantitative and qualitative data through formal research. This information is used to inform product-related hypotheses, recommendations, and ultimately user stories in the product backlog.

As a User Experience Designer you will be part of a team with more experienced team members to help build and grow your skills.

Major Tasks, Responsibilities And Key Accountabilities

20% - Planning & Analysis:
Communicates with key user and operational groups to understand business needs
Elicits ideas and assists team members with gaining shared understanding, and aligns the product team and stakeholders
Presents design concepts, user needs, and design rationale to multidisciplinary teams, as well as to key stakeholders and business

*FIG. 21*

Find a Job

Opportunities (12)

My Jobs (12)

🔍 Search jobs

User Experience Designer

▫ The Home Depot   ◉ Atlanta, GA

The Home Depot is looking for a user experience designer to add to our digital merchandise team. This position reports to the director of IT, and ...

 3 people in your network can refer you

Motion Graphics Designer

▫ Paycom   ◉ Oklahoma City, OK

This position assists the Sr. Motion Graphics Designer and is responsible for creating strong, creative, effective video content.

 7 people in your network can refer you

 Home    Find a Job    Refer    Contacts   ••• More

*FIG. 22*

FIG. 23

Refer

/ 2400

| Share Jobs (12) | Referrals (12) |
|---|---|

Celia Marshall
 Tulsa, OK

Recommend?

👥 Celia is interested in the job:

User Experience Designer
💼 The Home Depot   Atlanta, GA

87 Job Match / 1 Rank     View job listing ▶

Lily Steele
📍 Cleveland, OH

Recommended

👥 You have recommended Lily for:

User Researcher
💼 The Home Depot  📍 Atlanta, GA

73 Job Match / 4 Rank     View job listing ▶

Home | Find a Job | Refer | Contacts | More

*FIG. 24*

 

87
Job Match

Would you recommend Celia for User Experience Designer at the Home Depot?

Here are her skills vs those in the position requisition

- ▼ What Celia thinks her skill level is
- ● What the job requires

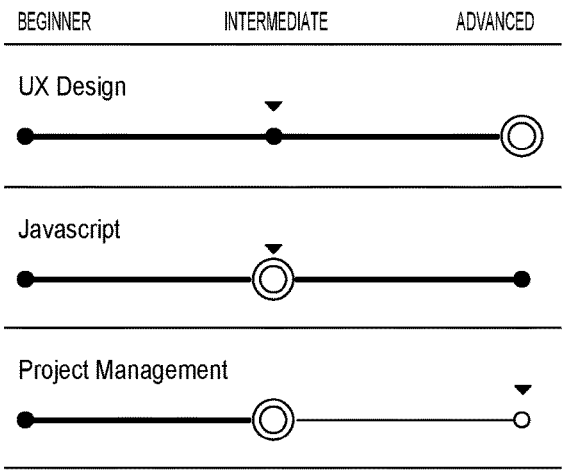

Project Management

Consulting

HTML

Rate Celia's personality characteristics as required by this job

LOW　　　MEDIUM　　　HIGH

Innovative

Driven

Good Team Player

Next: Write A Recommendation

*FIG. 25*

THREE-PARTY RECRUITING AND MATCHING PROCESS INVOLVING A CANDIDATE, REFERRER, AND HIRING ENTITY

CROSS-REFERENCE TO RELATED APPLICATIONS

The present application claims priority to and the benefit of U.S. Prov. Pat. App. 63/070,665, filed Aug. 26, 2020, titled "Three-Party Recruiting and Matching Process Involving a Candidate, Referrer, and Hiring Entity". The contents of the above-referenced application are incorporated herein by reference in their entirety for all purposes.

TECHNICAL FIELD

This disclosure relates to network systems. More specifically, this disclosure relates to a three-party recruiting and matching process involving a candidate, referrer, and hiring entity.

BACKGROUND

Conventional hiring practices may involve posting a job on a website or application. The job may be for part-time or full-time position at a company (e.g., software engineer, attorney at a law firm, sales person, etc.) or an on-demand position (e.g., landscaper, electrician, plumber, nanny, babysitter, etc.). Technology has enabled hiring entities to directly connect with candidates (e.g., job seekers) for these positions through various social networks that use the website or application. The website or application may convey numerous (e.g., hundreds, thousands, millions) job postings and numerous (e.g., hundreds, thousands, millions) resumes for candidates.

SUMMARY

In one embodiment, a method includes determining a job match between a candidate and a job posted by a hiring entity, providing the job match and referrer score for presentation on a computing device of a referrer, receiving, from the computing device of the referrer, a selection to share the job match with the candidate, transmitting, to the candidate, a message comprising the job match and information pertaining to the referrer, receiving, from the candidate, an acceptance for the referrer to recommend the candidate to the hiring entity for the job, transmitting, to the computing device of the hiring entity, a recommendation for the candidate on behalf of the referrer, receiving, from the hiring entity, a selection of the candidate to apply for the job, wherein the selection is based on the recommendation and job match score, and transmitting, to the computing device of the candidate, an invitation to interview for the job.

In one embodiment, a method includes searching for a job posted by a hiring entity, providing the job match and potential referral matches for presentation on a computing device of a candidate, receiving, from the computing device of the candidate, a request to a referrer to recommend the candidate to the hiring entity for the job, transmitting from the device of a referrer, to the computing device of the hiring entity, a recommendation for the candidate on behalf of the referrer, receiving, from the hiring entity, a selection of the candidate to apply for the job, wherein the selection is based on the recommendation and job match score, and transmitting, to the computing device of the candidate, an invitation to interview for the job.

In one embodiment, a method includes receiving, at a platform hosted by a cloud-based computing system, a plurality of contacts from a plurality of sources, wherein the plurality of sources comprise a social network, a native application on a computing device of a user, or both. The method includes processing the plurality of contacts to generate a contact center including at least a portion of the plurality of contacts, determining one or more job matches for each of the plurality of contacts, and providing, for presentation on the computing device of the user, the one or more job matches for each of the plurality of contacts.

In one embodiment, a method includes receiving, from one or more sources, data pertaining to a referrer, data pertaining to a candidate, and data pertaining to a job. The method includes determining, using a trained machine learning model, a referrer score for the referrer, wherein the referrer score pertains to an ability of the referrer to refer the candidate for the job, and the trained machine learning model uses the data pertaining to the referrer, the data pertaining to the candidate, and the data pertaining to the job as input, and outputs the referrer score. The method includes providing the referrer score for the referrer to a computing device for presentation in conjunction with at least a portion of the data pertaining to the candidate and the job.

In one embodiment, a tangible, non-transitory computer-readable medium stores instructions that, when executed, cause a processing device to perform any operation of any method disclosed herein.

In one embodiment, a system includes a memory device storing instructions and a processing device communicatively coupled to the memory device. The processing device executes the instructions to perform any operation of any method disclosed herein.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which:

FIG. 5 illustrates a user interface depicting a contact center according to certain embodiments of this disclosure;

FIG. 6 illustrates a user interface depicting options to set up a company, invite employees, and create a job requisition according to certain embodiments of this disclosure;

FIG. 7 illustrates a user interface for uploading contact information for employees to join the platform according to certain embodiments of this disclosure;

FIG. 8 illustrates a user interface for inviting employees to join the platform according to certain embodiments of this disclosure;

FIG. 10 illustrates another user interface for creating a job requisition and predicted information pertaining to the job according to certain embodiments of this disclosure;

FIG. 12 illustrates a user interface for previewing candidate matches for a job requisition according to certain embodiments of this disclosure;

FIG. 13 illustrates a user interface for presenting job requisitions according to certain embodiments of this disclosure;

FIG. 14 illustrates a user interface for presenting referrals for a job according to certain embodiments of this disclosure;

FIG. 17 illustrates a user interface for inviting a person to become a member of the platform according to certain embodiments of this disclosure;

FIG. 18 illustrates a user interface for a member to choose to get referred for a job or to refer a friend for the job according to certain embodiments of this disclosure;

FIG. 19 illustrates a user interface for a member set up their account according to certain embodiments of this disclosure;

FIG. 20 illustrates a user interface for uploading data from a third-party source according to certain embodiments of this disclosure;

FIG. 21 illustrates a user interface for presenting a job and friends and/or contacts that are able to be referrers according to certain embodiments of this disclosure;

FIG. 22 illustrates a user interface for presenting opportunities for a referrer according to certain embodiments of this disclosure;

FIG. 23 illustrates a user interface for sharing a particular job to a particular candidate according to certain embodiments of this disclosure;

FIG. 24 illustrates a user interface for recommending a job for a candidate that is interested in the job according to certain embodiments of this disclosure;

FIG. 25 illustrates a user interface comparing skills required for a job and the skills of a candidate according to certain embodiments of this disclosure;

NOTATION AND NOMENCLATURE

Figure 1:
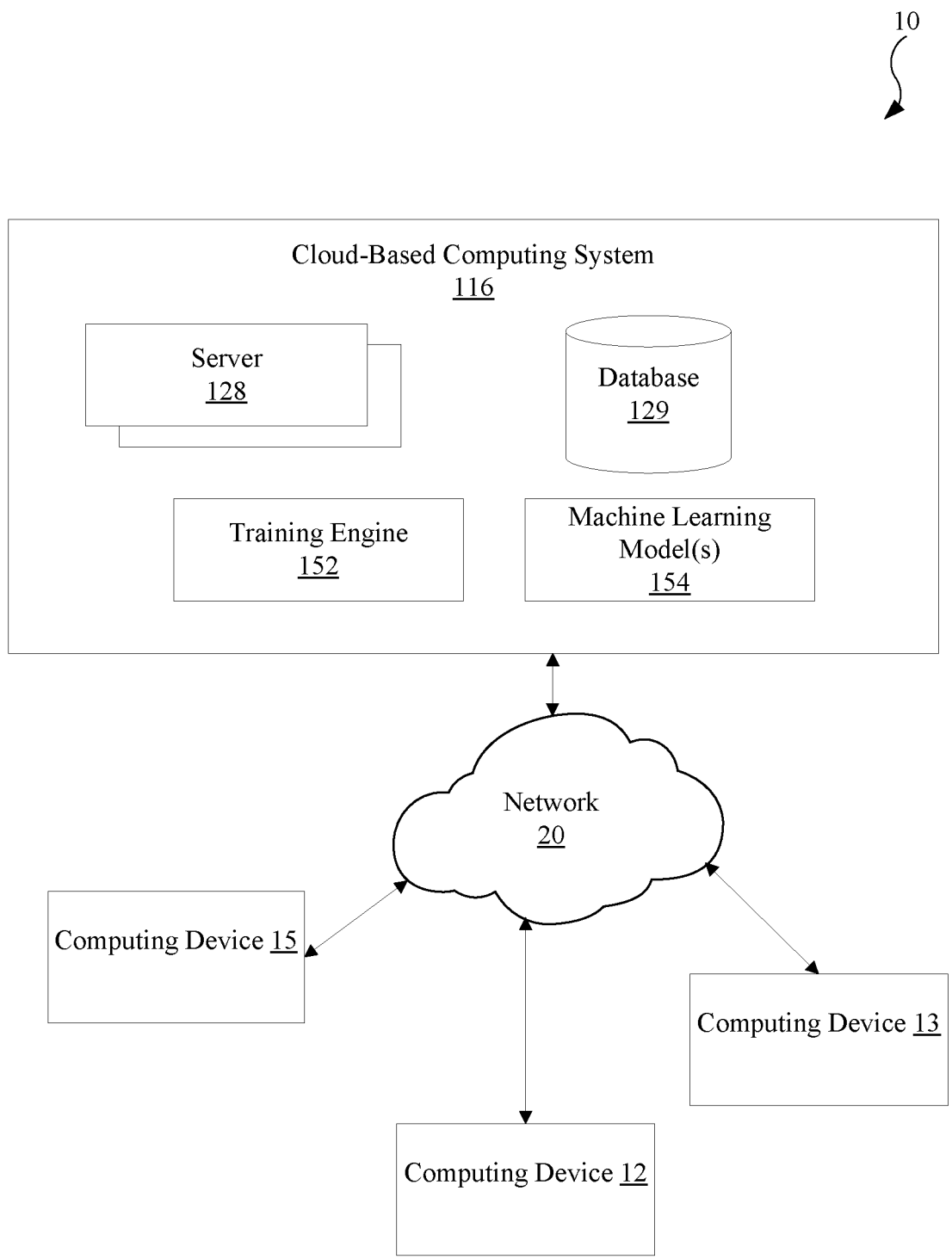
FIG. 1 illustrates a system architecture according to certain embodiments of this disclosure.
Figure 2A:
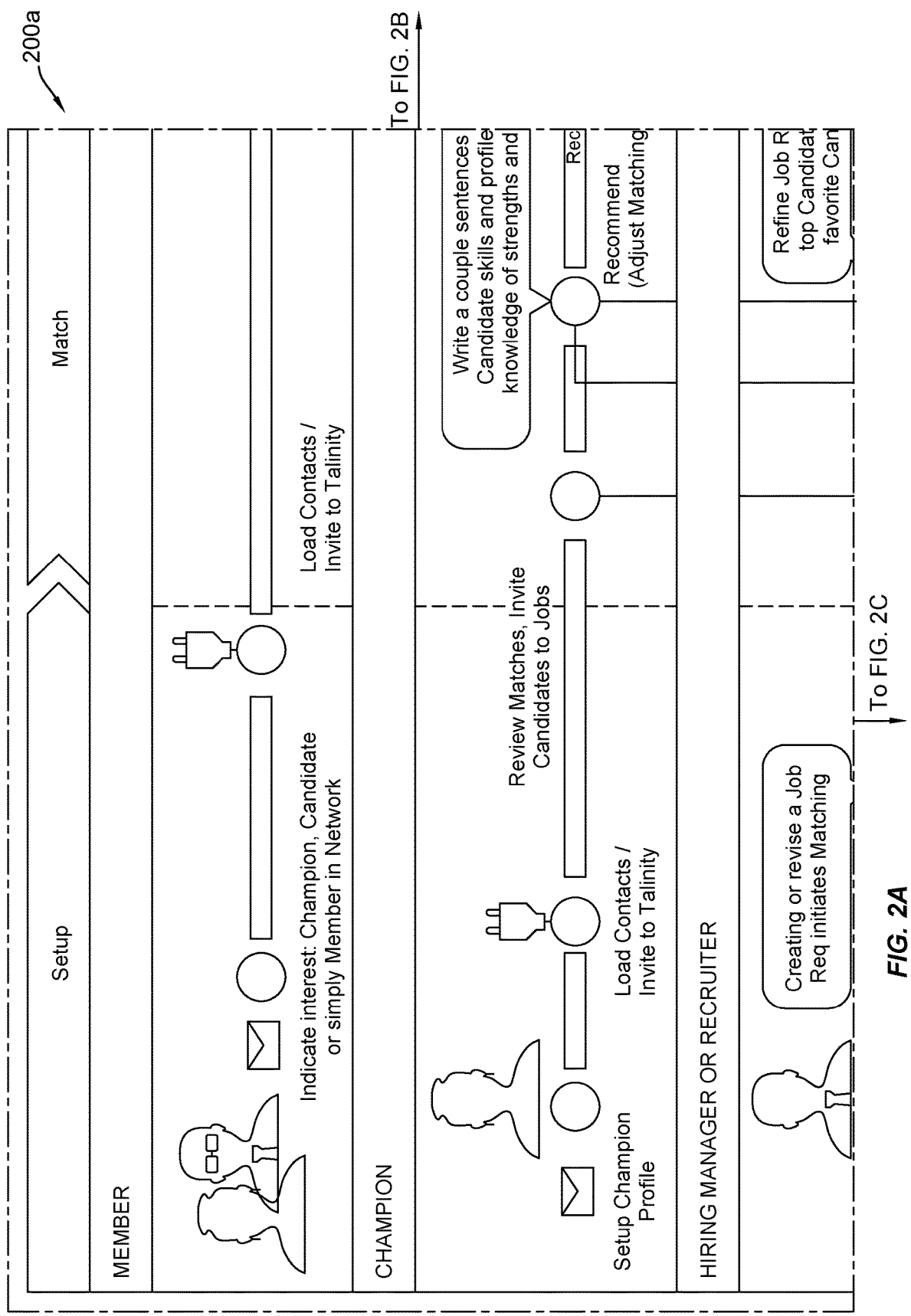
FIGS. 2A-2D illustrates a sequence diagram according to certain embodiments of this disclosure.
Figure 2B:
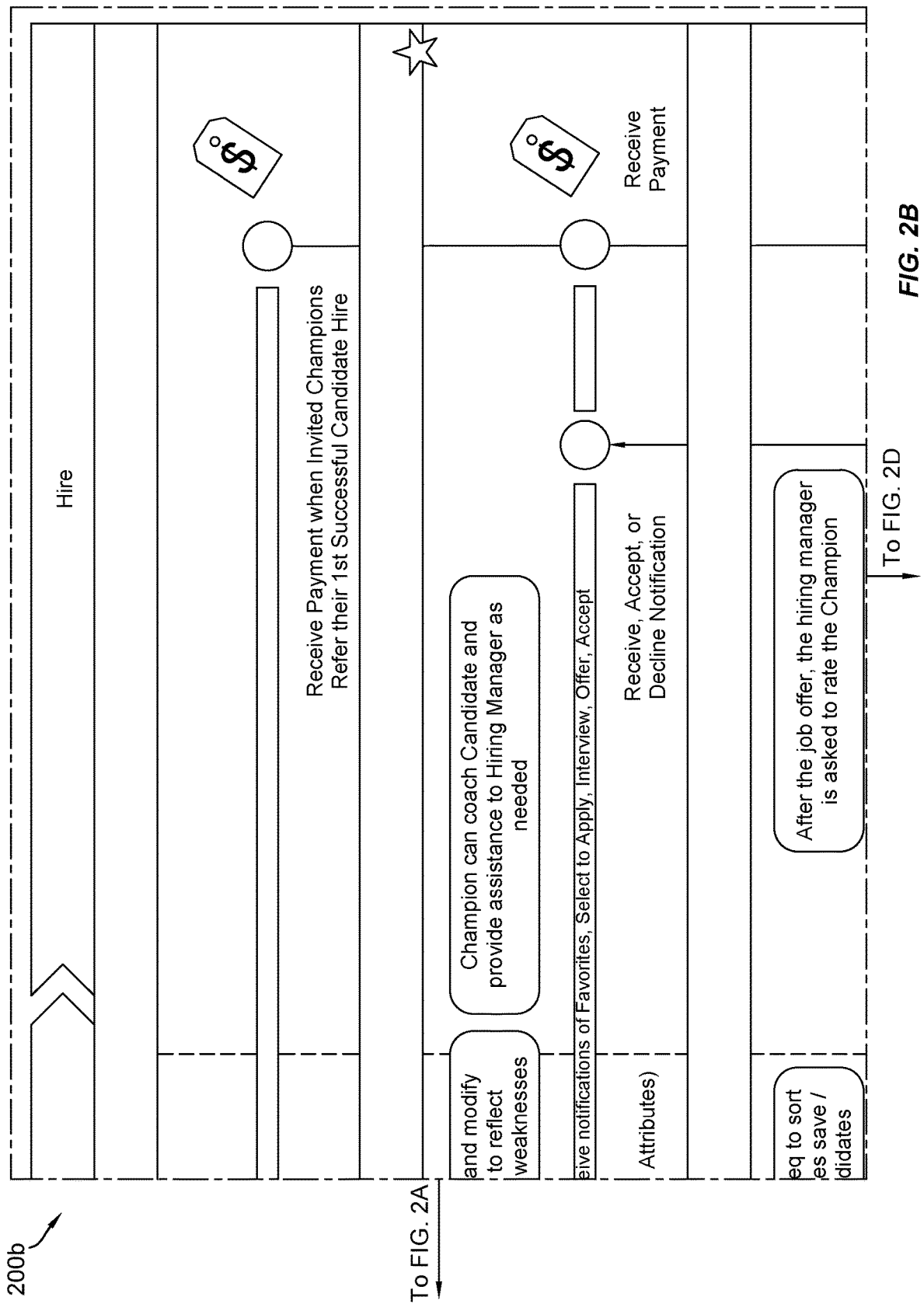
Figure 2C:
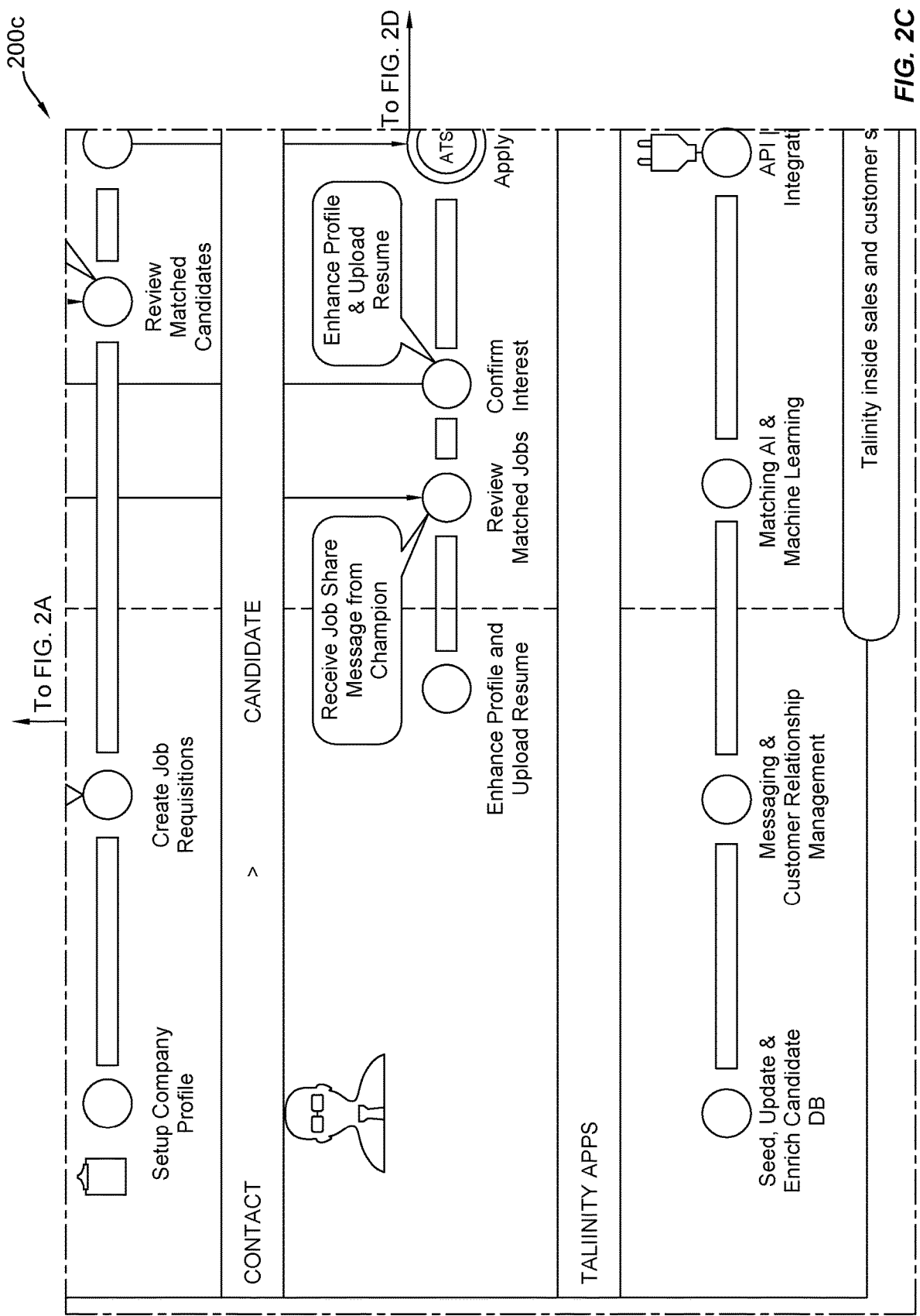
Figure 2D:
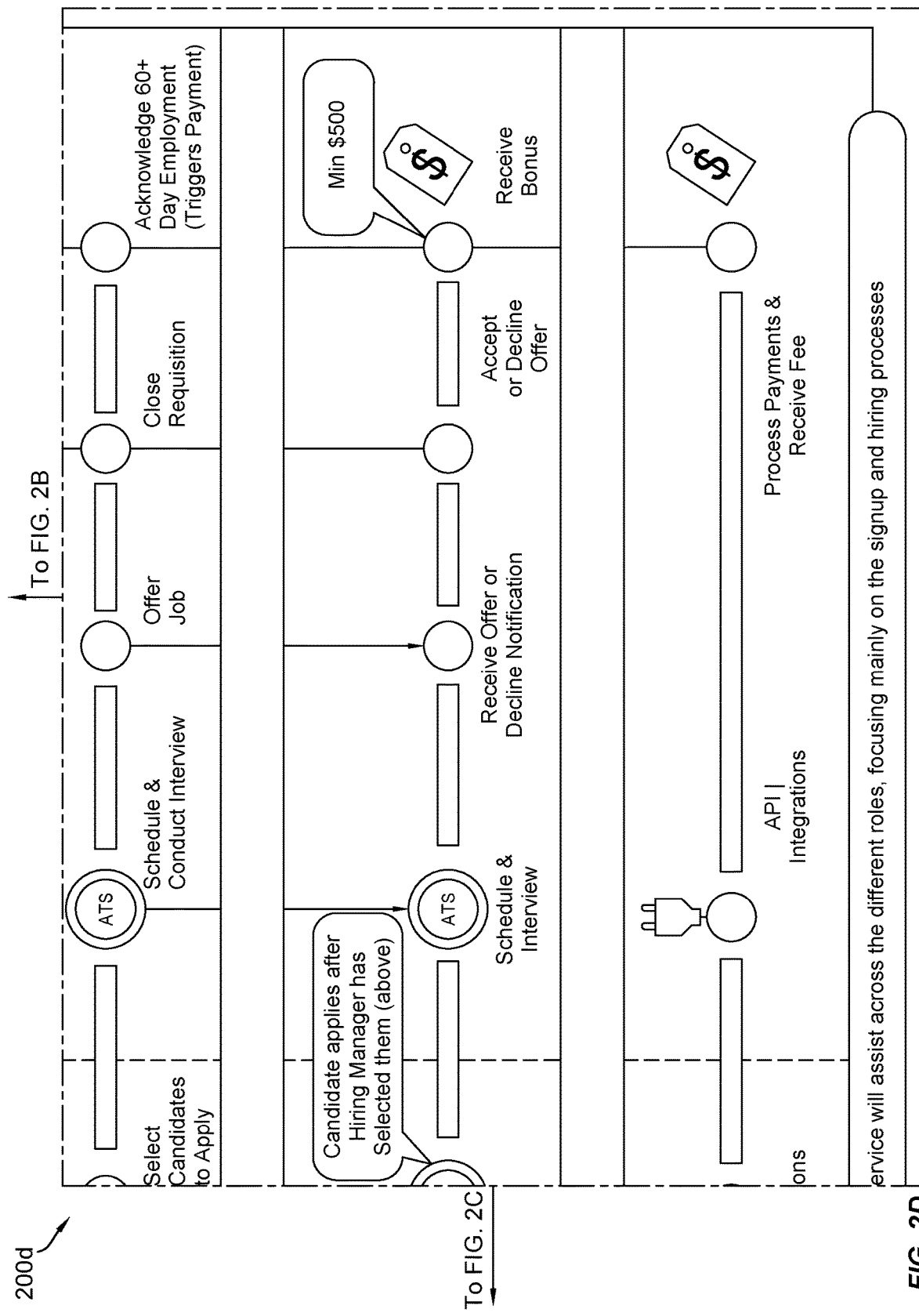

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIGS. 1 through 29, discussed below, and the various embodiments used to describe the principles of this disclosure in this patent document are by way of illustration only and should not be construed in any way to limit the scope of the disclosure.

Technology has allowed hiring entities to directly connect with job seekers in the field broadly known as talent acquisition. A person that has a history with a hiring entity may be trusted by that hiring entity. When a job is posted by the hiring entity, the hiring entity may value the person's opinion and recommendation of a particular candidate due to the trust. This trust may be referred to as referent power through knowledge and trust. This referent power frequently translates into a better fit of job seeker to job, a longer tenure with the hiring company, a less stressful job seeking experience and a more efficient process. Whereas anonymity between hiring companies and job seekers introduces uncertainty, anxiety, the need for third party testing, the need for more information (e.g., occupation, experience, skills, employment history, etc.) pertaining to candidates, more effort for both parties, more volume of candidates and other complexities. However, including known contacts to create a referral creates complexity and without the right system, can result in abuse of the referent power.

There may be technical challenges presented when using an anonymous system or using a referral system where the referrer is not properly tracked. For example, in an anonymous system, job postings may remain on a website or application for longer than is desired, thereby consuming time, human resources and computing resources (e.g., processing, memory, network) by having to maintain the data associated with the job posting for longer than desired. Further, even when a referrer refers a person to a job, the referrer may be biased and/or have a bad track history of referring people, thereby leading to the hiring entity hiring the candidate and having to potentially fire the candidate. As a result, the job posting has to be reposted to the website or application, thereby consuming time, computing and human resources.

The success of a hiring referral is based partially on the knowledge the referrer has of the candidate and the position (job) along with the referrer's own success. This knowledge and experience can be codified into variables like past success with referrals, firsthand experience together in the workplace, familiarity with the candidate's trade, their own success, their knowledge of personality characteristics and trust developed through firsthand interaction with the hiring manager or their team members.

Accordingly, in some embodiments, the present disclosure overcomes the above deficiencies and technical problems by providing a three-party recruiting and matching process involving a candidate, referrer, and hiring entity. The disclosed techniques may use artificial intelligence (e.g., machine learning models) to determine a referrer score for each referrer based on information pertaining to the referrer, a candidate, and/or a job posting. A platform may be hosted in a cloud-based computing system and the platform may intake the data from various external sources. The data may be in disparate and distinct formats particular to third-party proprietary systems. For example, the data may be received via one or more application programming interfaces (APIs) of social networks (e.g., LinkedIn®, Facebook®, etc.) and/or a native application executing on computing devices of various candidates, referrers, hiring entities, etc. The disclosed techniques may transform the format of the data received from the sources by codifying the data into a standardized format compatible with one or more machine learning models trained to perform the disclosed techniques. The machine learning models may receive the codified data in the standardized format and output a result in the standardized format that is consumable and/or compatible with an application and/or website executing on a computing device of the candidate, referrer, and/or hiring entity.

The referrer score may provide a prediction of the referent power of the referrer for a particular candidate. One purpose of the referrer score is to convey, with transparency to all three parties (referrer, candidate, and hiring entity), the amount of power (or credibility) that such referral might have to better help inform, make more efficient and reduce abuse related to actions such as (1) known contact's decision to begin the referral process with a particular candidate, (2) candidate's willingness to show interest in a job, and/or (3) the recommendation for a job. In some embodiments, the referrer score employs matching, predictive and machine learning algorithms to indicate the forecasted ability for a person to successfully refer a candidate for a position (job). In some embodiments, the score may be based initially on four of the five variables above, but may be weighted toward the first three: past referral success, first-hand knowledge of the candidate's experience in the workplace and familiarity with the candidate's trade.

In some embodiments, a three-party curation-based matching system may employ iterative machine learning from three parties in a highly scalable manner to match job seekers (candidates) to jobs with the help of a third party, the referrer, who plays an integral role to the machine learning process. Dimensionalized, codified data may be prepared from the candidate (e.g., received via an external source, a database, or the like) and hiring entity perspective in a manner that facilitates collaborative matching. This may include codified job skills, personality characteristics, and job requirements with associated discriminant values. With a guided process that defines steps that act as trusted boundaries, curated feedback loops allow for a derivative of skill and criteria values to serve as matching inputs from both endpoints (candidate and hiring entity).

In some embodiments, a job match process may be performed by codifying variables related to groupings of occupation roles, experience, and location. The various variables may be selected by the candidates via a user interface of a computing device used by the candidates. In some embodiments, the values of the various variables may be selected by a computing device to populate graphical elements by performing frequency analysis, relevancy analysis, and/or natural language processing. A corpus of data may be harvested from one or more sources related to employment and/or job postings. For example, online websites or social networks that describe job postings on job boards may be processed (e.g., via screen scraping techniques) to obtain text associated with the job postings. Natural language processing may be performed to identify a frequency of keywords used for each job posting and a relevancy of the keywords may be determined based on how many candidates select the job posting (e.g., determined via clicking on the job posting, "liking" the job posting, sharing the job posting, etc.).

The natural language processing may be performed by one or more machine learning models trained to use word embeddings to capture semantic properties of words. The words obtained from the websites or social networks may be transformed (e.g., using an autoencoder) to the one or more embeddings that are input into the machine learning models. The machine learning model may be trained to perform text and speech processing (e.g., optical character recognition, word segmentation (tokenization), etc.), morphological analysis, syntactic analysis (e.g., parsing, sentence boundary disambiguation, parsing, etc.), lexical analysis (e.g., lexical semantics (computation meaning of words in context), relational semantics (e.g., relationship extraction, semantic parsing, etc.), and the like.

The frequency and/or relevancy of keywords for each of the groupings (e.g., occupation role, experience, location) may be determined and a frequency score and/or a relevancy score may be assigned to each keyword. The keywords that have scores for one or both of the frequency and the relevancy may be selected and included in a respective list associated with each of the groupings (e.g., occupation role, experience, location). The lists may be included in separate graphical elements (e.g., dropdowns) presented on a user interface that is accessible to candidates, referrers, and/or hiring entities. Such a technique may enable higher conversion rates, improved matching and/or better user experiences with the user interface because the users are presented with the most frequently used and relevant terms for the groupings.

The variables may be used in one or more calculations to determine a job match for a candidate to a job and/or for a referral strength to match the candidate to the referrer. Coefficients for each variable may be modified to adjust a weight for each of the variables. For example, a coefficient for location may be higher than a coefficient for experience if it is determined that the candidate or a hiring manager sees location as more important than other factors like job experience. Coefficients also may be adjusted based on the relative importance of such input variables in certain industries or in certain occupations. For example, certifications and licenses may be critical in some professions but of lower value in others.

The machine learning models may be continuously trained to determine matches and/or referrer's scores based on newly received data pertaining to candidates, referrers, and/or jobs. The disclosed techniques may update various weights based on which candidates hiring entities select. For example, the profiles of the selected candidates may be analyzed to determine which criteria the hiring entity liked and may update the machine learning models to provide subsequent candidates having those criteria as matches to the hiring entity. Further, information pertaining to the referrer may be used to update the machine learning models that determine the referrer score. For example, numerous factors may be tracked and used to update weights associated with determining the referrer's score, such as past success referring candidates, the success of the referrer in the workplace, experience of the referrer as it pertains to the candidate's trade, etc. As a result, the disclosed techniques enable more accurate and/or efficient processes for hiring entities to hire candidates and/or candidates to find jobs because of the use of a scored third-party (referrer) that is able to leverage referent power to recommend candidates to certain hiring entities.

At least two virtuous loops may be utilized in some embodiments. The two virtuous loops may include an invitation loop and a referral loop. The invitation loop may include a feature referred to as "MatchMyContacts" and the referral loop may include a feature referred to "ReferralStrength" and "JobMatch". Both loops may involve job requisitions and may benefit from an iterative process motivated by a predictive algorithm referred to as "TalinityPredict" that may be used to predict, for each job requisition, a number of potential candidate matches, a number of potential referrals, a number of potential applications, a number of potential interviews, and/or a number of possible acceptances for job offers.

Both of the virtuous loops may overcome numerous technical problems related to data and analytics. For example, a member (e.g., candidate, referrer, hiring entity) of the platform may be enabled to invite other non-members to join the platform, however, such a feature may require having access to a contact center. Accordingly, the disclosed techniques may interoperate with a number of other sources (e.g., social networks, personal devices (smartphones)) and retrieve contacts from those sources. The disclosed techniques may merge the contact lists and de-duplicate contacts in the merged contact list to generate a contact center. The user may invite non-members of the platform included in the contact list to join the platform, and also to notify those people of one or more job matches. Further, the invitation may request that the candidate let the user become a referrer, which provides the referrer permission to recommend the candidate for the one or more job matches. Further, the analytics that is used in the disclosed techniques may enable identifying jobs that are relevant to certain candidates based on matching criteria (e.g., experience, skill, education, geographic location, personality characteristics, etc.) on both the hiring entity side and the candidate side.

Regarding the referral loop, in some embodiments, a "JobMatch" score may be determined based on the criteria listed above and a rank may also be determined relative to other jobs that candidates are matched with. In addition, the disclosed techniques determine a referrer score for each referrer for each particular candidate and each particular job, which makes it transparent to all three parties (e.g., candidate, referrer, hiring entity). To make this process effective, there may be multiple versions of "JobMatch" to create an effective process and user experience. One version of "JobMatch" may execute real-time (e.g., less than 5 seconds) as part of the "TalinityPredict" capability for hiring entities, using a highly scalable indexing and search technology, where advanced analytics, weighting, and machine learning methods are embedded. Another version may create a "JobMatch" score for candidates and initiates the referrer scoring. The different versions may execute concurrently and the results may use various tolerance levels to converge over time. Hiring entities do not need to see all the candidates at a particular time, since any candidates may be passive (e.g., not actively seeking a new job). The disclosed techniques may reduce network bandwidth usage by just transmitting candidates to computing devices of hiring entities when the referrer is enabled to recommend those candidates. That is, as opposed to some conventional hiring systems that transmit all data relating to matching candidates to the computing device of the hiring entity, the disclosed techniques reduce the amount of data sent via over a network by just sending recommended candidates by referrers where those recommended candidates are also good matches for the hiring entity.

The disclosed techniques may utilize bi-directional matching between referrers and candidates. In some embodiments, candidates may be presented to hiring entities once, but the candidates may have multiple referrer opportunities. Further, each referrer may be enable to refer more than one candidate. Also, the candidate and the referrer may be offered various incentives for participating in the hiring process, and if the candidate is hired by the hiring entity, the incentives may be transmitted to the referrer and/or candidate (e.g., an amount of money and/or a coupon may be deposited in a digital wallet on the computing device of the referrer and/or candidate). This may create a mini-marketplace that gives both parties a sense of urgency, thereby reducing the time elapsed from the posting of the job req to the identification of qualified candidates.

Regarding members of the platform hosted by the cloud-based computing system, various features may be used, such as "MatchMyContacts", "ContactCenter" with automatic "InnerCircle" influenced by "RelationshipStrength". Regarding the hiring entity, statistical methods may be applied to input variables associated with a job requisition against the candidate population to predict the relevant candidate cohort for each stage of a recruiting "funnel" where machine learning models may adjust job funnel conversion based on the following factors: network strength and referral potential of the candidates in question, job role, seasonality, compensation, industry, geography and the hiring company. Job role conversion ratios may be adjusted at varying levels of a five level (or any suitable level) hierarchy built from classification and nearest neighbor statistical methods, for example. Referral potential is calculated based on the referrer score of immediate contacts for a candidate. Regarding the candidate, "NetworkStrength" and referrer score may motivate a data enrichment loop for the member in question and each participating member. In some embodiments, bi-directional two-step pairing of the candidate and champion may effectively create a mini-marketplace and results in motivation of passive candidates a full order of magnitude faster than any other method. Regarding the referrer, rating of values by known third-parties may directly impact retention with measureable outcomes given the ability to isolate variables with regression testing.

In some embodiments, several different computer-implemented processes may be implemented in computer instructions to implement one or more referral techniques to improve matching candidates to jobs. The instructions may be executed by one or more processing devices. The referral techniques may be embodied individually or in any combination in a multi-user computer system ("cloud-based computing system") that implements a talent acquisition system ("platform").

For purposes of illustration, the processes are described primarily in the context of a system that recommends candidates for jobs through applications used with a web site and/or mobile application. As will be apparent, however, the disclosed processes can also be used in other types of systems, and can be used to support referrals and recommendations for other types of items, people, companies and groups of people, such as but not limited to service providers for the home (e.g. home, lawn and interior maintenance, tax preparation, financial planning, accountants, attorneys, doctors), service providers for business (e.g. telco providers, internet providers, office space providers, computer providers, outsourcing providers of many different types of services), travel, restaurants, retail and many different types of entities. In addition, the disclosed processes need not be implemented as part of, or in conjunction with, a web site or mobile application.

As previously discussed, the referrer score provides an indication of the referrer's credibility and may be different for every referrer's candidate(s). Machine learning models enable for re-calculation based on micro, macro and global feedback loops. Micro feedback loops within the referral process enable the referrer score algorithm to improve predictive accuracy for a particular candidate. Macro feedback loops make use of actions at the conclusion of a completed referral process. Global feedback loops make use of actions across multiple referrers, during and at the conclusion of referral process to apply them to all referrers.

At least six factors may influence the credibility of a candidate referral: past success with referrals, firsthand experience together in the workplace, familiarity with the candidate's trade, their own success, their knowledge of personality characteristics and strength of connection to the hiring company/manager. The ability to refer based on experience in the workplace differs depending on the working relationship context, e.g. teammate, supervisor, reported-to, different teams. The ability to refer based on familiarity of the candidate's trade varies based on both the referrer's own knowledge of the trade and their knowledge of how the candidate performed job functions in the trade. The ability to refer based on the candidate's personality characteristics may depend on (1) how well the referrer was able to objectively recognize the success or failure of the candidate's accomplishments based on these characteristics (e.g. self-motivated, collaborative, professional, etc.), and (2) how well the referrer assesses those characteristics versus the job requirements. Accordingly, the impact to the credibility of the referrer may be based on the referrer's past ability to convey candidate personality characteristics, aided by machine learning over time. The ability to refer based on the referrer's own success varies because, presumably, the referrer's experience (coupled with familiarity with the candidate) conveys good career decisions and that, the more successful they are, the less they have to gain from a referral. The implication of a person with a good reputation referring a candidate is that they are willing to put their reputation behind that candidate.

In some embodiments, a referrer score (also referred to as referral strength herein) and a job match score may be based on one or more codified variables, such as experience, occupation, and location. Each of the codified variables may be associated with a coefficient whose weight may change dynamically. For example, the weights may be modified to enhance relevancy and useful impacts the codified variables provide to increasing a job match and/or a conversion of a candidate to a hire based on the referral of the referrer for the candidate.

A score for an experience variable (which may be a component made up of skills, certifications, specialties, and other variables used in both determining a job match score and the referrer score) may be associated with a coefficient weight that decreases for each matched skill (e.g., in a non-linear manner). For example, the weight of the coefficient for the experience variable may be determined based on a number of experience characteristics (e.g., skill, certifications, specialties, etc.) matched divided by square root of a number of experience characteristics desired. In some embodiments, the weight of any particular characteristic may increase or decrease within a set if the characteristic is required versus "nice-to-have". Further, the coefficient's weight for the experience variable for the job match score and referrer score may vary based on whether one or both of evaluated parties (e.g., a referrer and candidate or job requisition) has no detected values. For example, a shape of a curve for a user having a not-null value and a job requisition having a not-null value may differ from values between the user and job requisition having null to not-null (near linear) and not-null to null (linear), respectively.

A score for an occupation variable may involve normalizing a job title associated with a job requisition to a standardized set of occupations. In some embodiments, a machine learning model may be trained using a corpus of training data including inputs of job titles mapped to outputs of standardized occupations. Various probabilities may be determined by one or more layers of the machine learning model that indicate which standardized occupations are most likely associated with the input job titles. In some embodiments, an ontology may be used to select a strongest match, provided synonyms with a similarity score. That is, the machine learning model may also be trained with training data including synonyms for standardized occupations and similarity scores for each synonym to the standardized occupations.

In some embodiments, the initial referrer score may be determined based on the following relationship:

$$a*CS+b*W(r)+c*TK(f)+d*CPO+e*RCS+f*JD+g*FS$$

where a, b, c d, e, f, and g are coefficients that the platform improves over time with machine learning. CS is the referrer success score based on the number of successful referrals divided by the number of referrals. W is the Working relationship, which varies by the context variable, r, which can have the values teammate, manager, subordinate, etc. The Working relationship may account for an occupation score (e.g., similarity) and/or an experience score (e.g., similarity). The Working relationship may be determined using a function (e.g., linear and non-linear) that accounts for various codified variables, such as the experience, occupation, location, etc. TK is the Trade Knowledge based on the number of years in the industry (calculated by SIC code of company and title in the work history). The Trade Knowledge may account for an occupation score (e.g., similarity) and/or an experience score (e.g., similarity). The Trade Knowledge may be determined using a function (e.g., linear and non-linear) that accounts for various codified variables, such as the experience, occupation, location, etc. CPO is the Champion personality characteristic observation capability. RCS is the referrer's career success. Without any prior referrals, RCS is scored only if the profile of the referrer has been verified to be a supervisor of the candidate. JD is the Job Distance, defined by the number of connections between the referrer and either hiring entity or employee on the team of the hiring manager (e.g., the Job Distance may also be referred to network distance herein).

For clarity, further explanation of the variables is now provided: CS may be a percentage whole number, 0-100. W(r) may be a calculated value (0-100) based on discrete conditions such as teammate, manager, etc. TK may be a score (0-100) that takes inputs of the candidate's skill and experience section of their profile and number of years of experience in jobs (classified into SIC codes) compared to referrer's skill and experience section of their profile and number of years of experience in jobs (classified into SIC codes). TK inputs may be filtered by must-have job requisition skills and experience categories, then weighted by an additional coefficient, set by a predictive algorithm, for the nice-to-have job requisition skills and experience categories. CPO may be a calculated value, based on a history of evaluating personality characteristics of an individual versus a job's requirements, then feedback from the hiring entity, aiding and/or updating training of the machine learning models. RCS may be a rating (0-100). RCS may be a calculated value (0-100) based on the referrer's career progression. The referrer may receive some portion of the value if they are verified to be a supervisor for the candidate. Additional value may be assigned based on progression of job titles and companies in their work history. An algorithm may interpret the job history and uses machine learning from observation and revision with each assigned value. Additional attributes from data enrichment such as net worth may be used to help verify and adjust RCS. JD may be a calculated value with 100 assigned when the referrer has shared work experience and shared skills along with a direct connection to the aforementioned hiring manager or team members.

In some embodiments, the initial referrer score and/or a job match score may be determined based on the following relationship:

$$a*OS+b*ES(f)+c*L(f)$$

where a, b, and c are coefficients that the system improves over time with machine learning. OS, ES, and L may refer to codified variables. OS(f) is the occupation scoring function, ES(f) is the experience scoring function, and L(f) is the location score. The location score may be determined based on the candidate's distance from a job using a Gaussian decay curve, which may be overridden for certain combinations of candidates and job requisitions where the candidates are open for remote work and the job requisition is open for remote work. The occupation scoring function may include a variable associated with an occupation role, which can be a high-level occupation role, such as dentist, nurse, doctor, lawyer, etc. The experience scoring function may include a variable associated with an experience and may include skills, certifications, licenses, specializations, clearances, and other classifications. The location scoring function may include a variable associated with a location, where the location may refer to an address, geographical distance between an address of a job and an address of a referrer and/or candidate. In some embodiments, the coefficient weight assigned to a score for skills may decrease for each matched skill (e.g., in a non-linear manner) versus the total required skills for the job requisition to provide a relevant and useful impact to job matching and referrer matching for candidates, as discussed above.

The referrer score may be associated with referral strength between a candidate and a referrer or a referrer and a job. In some embodiments, the referrer score may account for a network distance between the referrer and the hiring entity and/or the candidate and the hiring entity. The job match score may be associated with a strength of a job match between a candidate and a job. The occupations may be subdivided into experiences such as the skills, certifications, licenses, specializations, clearances, and other classifications. The user interface may dynamically present various experiences for a selected occupation by the candidate. The experiences' values for a nursing occupation role may include specialties and their associated values of emergency room, critical care, medical-surgical, etc.; licenses and their associated values of registered nurse (RN), certified nursing assistant (CNA), licensed practical nurse (LPN), nurse practitioner (NP), etc.; and so forth. The experience groupings may vary by groups of occupation roles.

As previously discussed, the values of the underlying ontology of the system of the occupations, experiences, and/or locations may be selected based on frequency analysis, relevancy analysis, and/or natural language processing. Such techniques may enhance conversion for profile completion for members (e.g., candidates and/or referrers) of the platform, as well as for job requisition attribution. In some embodiments, the techniques may enhance matching for both job matches (candidates with jobs) and referral matches (candidates with referrers). Separating artificial intelligence natural language processing and data detection processes from the matching may enable highly performant and scalable system processes that execute independently. The techniques may enable a data ontology that codifies the data (e.g., candidate data, referrer data, job data) to a normalized structure. The normalized structure may represent codified values as input from both sides: member and job. In some embodiments, the set of codified values in the experience groupings may represent a dictionary from which newly detected values can be evaluated from free text typed by members (candidate and referrers), as well as from natural language processing and frequency analysis in a multitude of job requisitions.

Further, isolation of codified values (e.g., occupation, experience, location) into the matching processes (job match and referral strength) may enable a highly performant system process for the platform and may optimize coefficient assignment (e.g., weighting of inputs like occupation versus experience versus location). In some embodiments, in addition to using machine learning models, the platform may use the normalized data structures stored in relational tables and primary keys (e.g., the codified values) associated with the variables for the referrer score and the job match score. The codified values (e.g., occupation role, experience, and location) may enable efficient matching between candidate and a job and between a candidate and a referrer.

In some embodiments, the platform may present a job match score in an easily digestible manner (e.g., 0-5 stars), with ranges set to reflect a member's perception of fit, eleicit the optimal motivation to perform core actions in the 3-party-collaborative referral platform, including sharing, requesting referrals, referring and requesting the candidate to apply, and the like. The referral platform may simplify and reduce the amount of data entry when candidates, referrers, and/or hiring entities are entering profiles and/or job requisitions. For example, numerous skills related to a job are not needed to be entered because the collaborative hire-by-referral system, which enables transmitting notifications to users when their profile, job match score, referrer score, and/or job requisition satisfies a minimum threshold, may automatically populate various skills fields.

In embodiments, the platform provides an optimized blend of "filler" jobs with customer monitored jobs and members (candidates and referrers), which creates a bi-directional attraction, liquidity and sustained membership in each market segment, defined by role-industry-geography. In some embodiments, a minimum number of jobs, candidates, and referrers may be determined per role, industry, and/or geographical location of the job. The minimum number(s) may be determined using membership acquisition steps of a funnel conversion process in collaborative hire-by-referral in conjunction with the engagement rates for members. The funnel conversion process may include conversion rates for the following: (1) accepting an invitation or selecting to download an application from a trusted professional entity, (2) entering profile information needed to perform functions for either finding a job or referring (e.g., occupation, experience, and location), (3) inviting others in their network, (4) share or request referral, and (5) refer or apply. These conversion rates may enable determining the number of candidates and/or referrers for a job. The engagement rate for core actions for a certain time period (e.g., per week) may be based on a probability that a member will be interested in a new position, given N number of contacts in each person's network, then the number of jobs provided to sustain a membership may be determined by using a distribution of occupations and experience parameters and density of a network. In some instances, referral conversion may be higher where network distance is low (e.g., the job is geographically close to the candidate's location). "Filler" jobs may help with candidate interste relating to occupation and experience distribution, but a customer monitored jobs may provide network connectivity, and therefore, a referral strength score that encourages core actions for members, both candidate and referrer.

Turning now to the figures, FIG. 1 depicts a system architecture 10 according to some embodiments. The system architecture 10 may include a computing device 12 of a user (e.g., referrer), a computing device 13 of a candidate, and/or a computing device 15 of a hiring entity (e.g., employer, job poster, etc.) communicatively coupled to a cloud-based computing system 116. Each of the computing devices 12, 13, 15 and components included in the cloud-based computing system 116 may include one or more processing devices, memory devices, and/or network interface cards. The network interface cards may enable communication via a wireless protocol for transmitting data over short distances, such as Bluetooth, ZigBee, NFC, etc. Additionally, the network interface cards may enable communicating data over long distances, and in one example, the computing devices 12, 13, 15 and the cloud-based computing system 116 may communicate with a network 112. Network 112 may be a public network (e.g., connected to the Internet via wired (Ethernet) or wireless (WiFi)), a private network (e.g., a local area network (LAN) or wide area network (WAN)), or a combination thereof. Network 112 may also comprise a node or nodes on the Internet of Things (IoT).

The computing devices 12, 13, 15 may be any suitable computing device, such as a laptop, tablet, smartphone, or computer. The computing devices 12, 13, 15 may include a display capable of presenting a user interface of an application. The application may be implemented in computer instructions stored on the one or more memory devices of the computing devices 12, 13, 15 and executable by the one or more processing devices of the computing device 102. The application may present various screens to a user that enable the three-parties (e.g., candidate, referrer, and hiring entity) to perform the functionalities described herein. In some embodiments, the application is a stand-alone application installed and executing on the computing devices 12, 13, 15. In some embodiments, the application (e.g., website) executes within another application (e.g., web browser). The computing devices 12, 13, 15 may also include instructions stored on the one or more memory devices that, when executed by the one or more processing devices of the computing devices 12, 13, 15, perform operations of any of the methods described herein.

In some embodiments, the cloud-based computing system 116 may include one or more servers 128 that form a distributed computing architecture. The servers 128 may be a rackmount server, a router computer, a personal computer, a portable digital assistant, a mobile phone, a laptop computer, a tablet computer, a camera, a video camera, a netbook, a desktop computer, a media center, any other device capable of functioning as a server, or any combination of the above. Each of the servers 128 may include one or more processing devices, memory devices, data storage, and/or network interface cards. The servers 128 may be in communication with one another via any suitable communication protocol. The servers 128 may execute an artificial intelligence (AI) engine that uses one or more machine learning models 154 to perform at least one of the embodiments disclosed herein. The cloud-based computing system 128 may also include a database 129 that stores data, knowledge, and data structures used to perform various embodiments. For example, the database 129 may store profiles for referrers, candidates, members, hiring entities, and the like. The database 129 may also store information pertaining to job postings or job requisitions. Although depicted separately from the server 128, in some embodiments, the database 129 may be hosted on one or more of the servers 128.

In some embodiments the cloud-based computing system 116 may include a training engine 152 capable of generating the one or more machine learning models 154. The machine learning models 154 may be trained to determine referrer scores, determine job match scores, match candidates with referrers, match candidates with job postings, generate contact centers, analyze data, and/or process data, among other things. The one or more machine learning models 154 may be generated by the training engine 130 and may be implemented in computer instructions executable by one or more processing devices of the training engine 152 and/or the servers 128. To generate the one or more machine learning models 154, the training engine 152 may train the one or more machine learning models 154.

The training engine 152 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 152 may be cloud-based, be a real-time software platform, include privacy software or protocols, and/or include security software or protocols.

To generate the one or more machine learning models 154, the training engine 152 may train the one or more machine learning models 154. The training engine 152 may use a base data set of candidate profile information (e.g., demographic information, psychographic information, education, experience, skills, geographic location, etc.), referrer information (e.g., demographic information, psychographic information, past success with referrals, firsthand experience together with the candidate in the workplace, familiarity with the candidates trade, the referrer's success in the workplace, the referrer's knowledge of personality characteristics and strength of connection to the hiring entity, network distance between the referrer and the hiring entity, etc.), and/or hiring entity/job information (e.g., name, position, job title, desired experience, desired skills, desired personality traits, desired geographical location, etc.).

The one or more machine learning models 154 may refer to model artifacts created by the training engine 152 using training data that includes training inputs and corresponding target outputs. The training engine 152 may find patterns in the training data wherein such patterns map the training input to the target output and generate the machine learning models 154 that capture these patterns. For example, the machine learning model may receive candidate information as input and output a matching job based on a pattern. The machine learning model may receive candidate information and job posting information as input and output a job match score based on one or more variables related to occupation, experience, and/or location, among others. The machine learning model may receive candidate information and referrer information as input and output a referrer score based on one or more variables related to occupation, experience, and/or location, among others. The machine learning model may receive information related to the referrer and output a referrer score using the relationship described above. The machine learning models 154 may be continuously tuned to vary certain weights to cause some factors of candidates and/or referrers to be more important than others. Although depicted separately from the server 128, in some embodiments, the training engine 152 may reside on server 128. Further, in some embodiments, the database 150, and/or the training engine 152 may reside on the computing devices 12, 13, and/or 15.

As described in more detail below, the one or more machine learning models 154 may comprise, e.g., a single level of linear or non-linear operations (e.g., a support vector machine [SVM]) or the machine learning models 154 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons.

In some embodiments, the machine learning models may be trained to automatically tune and/or select various features to be modified in an optimized way based on its output or output from another machine learning model. For example, the features that may be modified may include a number of layers in the machine learning model, the number of nodes included in each layer, the activation function used for a node and/or layer, the weights use by each node, and/or any suitable feature of the machine learning model. Accordingly, the machine learning models may be tuned and/or retrained dynamically as the platform operates and receives feedback regarding accuracy and success/failure of matches (e.g., candidates to jobs and/or candidates to referrers).

FIGS. 2A-2D illustrate a sequence diagram 200 according to certain embodiments of this disclosure. The sequence diagram 200 may include three stages, setup, match, and hire. Participants in the sequence diagram 200 may include a member, a champion (also referred to as referrer interchangeably herein), and a hiring manager (also referred to as hiring entity interchangeably herein) or recruiter.

During the setup stage, the member (e.g., the candidate, the champion, or a member in the network) may use a computing device accessing the platform to indicate their interest in a job posting. The member (e.g., candidate) may use their computing device to setup their profile and load contacts (e.g., via social network or a native application that stores a list of contact on the computing device 12). In some embodiments, the user may be enabled to specify different profile information for job seeking (e.g., job search preference) versus referring (e.g., experience as well as knowledge areas relating to strong working relationships). In some embodiments, the profile information may be automatically populated for the job seeking information and the referral information, and the candidate may be enabled to modify the information as desired.

The champion may use their computing device 12 to setup their profile and load contacts (e.g., via social network or a native application that stores a list of contact on the computing device 12). The champion may also invite people in the contact list to the platform to become members. Further, during the setup stage, the hiring manager or recruiter may use their computing device 15 to setup a company profile and create a job requisition. In some embodiments, creating or revising a job requisition may initiate matching between a candidate member and the job requisition (job posting) and/or the candidate member and one or more champions. During the setup stage, the candidate may enhance their profile and upload a resume. In addition, the cloud-based computing system 16 executing the platform may seed one or more machine learning models with training data related to candidates, champions, hiring managers, recruiters, and/or job requisitions. The platform may update and enrich the candidate database. Further, the platform may message and perform customer relationship management.

During the match stage, the champion may review matches with candidates based on referral strength represented by a referrer score associated with the champion, the job requisition, and the candidate. The champion may be presented with a list of candidates for which the champion has a referrer score above a threshold score. Further, the candidate may also review matched jobs having a job match score above a threshold score. The champion may select one of the candidates associated with a referrer score above the threshold and invite the candidate to allow the champion to refer the candidate to a particular job. The candidate may receive a job share message from the champion. If the candidate accepts the champion, the champion may recommend the candidate for the job requisition. The champion may write a recommendation and modify the candidate's skills and profile to reflect the champion's knowledge of the strengths and weaknesses of the candidate. The hiring manager or recruiter may receive the recommendation from the champion and review matched candidates. The hiring manager or recruiter may refine job requisitions to sort for top candidates, save candidates for later, and/or select some candidates as favorites. The hiring manager or recruiter may select one or more of the candidates to apply for the job requisition. Once selected, a message may be transmitted to the candidate and the candidate may apply for the job. Further, during the match stage, one or more machine learning models may be executed by the artificial intelligence engine to perform the matching of the candidate to the job requisition and/or the candidate to the champion. In some embodiments, one or more application programming interfaces may be used to integrate various systems and platforms.

At the hire stage, the member may receive payment when an invited champions refer their first successful candidate hire. For example, the member may have invited the champion to the platform and the member may be compensated for the champion referring a successful candidate hire. Accordingly, a marketplace may be created for recommending successful champions. During the hire stage, the hiring manager or recruiter may schedule and conduct an interview with the candidate. The champion can coach the candidate and provide assistance to the hiring manager as needed. If the hiring manager or recruiter likes the candidate, a job offer may be transmitted to the candidate. The hiring manager or recruiter may transmit a job offer to the candidate. The candidate may receive the job offer and accept it or decline it. After the job offer, the hiring manager or recruiter may rate the champion. The job requisition may be closed and a notification may be transmitted to the champion. The champion may receive the notification whether the candidate accepted or declined the job offer. If the candidate accepted the job offer, the champion may receive payment in a digital wallet associated with the champion. The digital wallet may be included in PayPal®, Google Pay®, Apple Pay®, Venmo®, or any suitable digital wallet. The hiring manager or recruiter may acknowledge when the candidate has been employed for a certain time period (e.g., 60 plus days), which may trigger a payment. The candidate may receive a bonus payment that is deposited into a digital wallet associated with the candidate. The platform may execute payment applications such as those described above or any suitable payment processor (e.g., credit card, financial institution, or the like) to process payments to the participants in the platform and/or receive fees.

Figure 3:
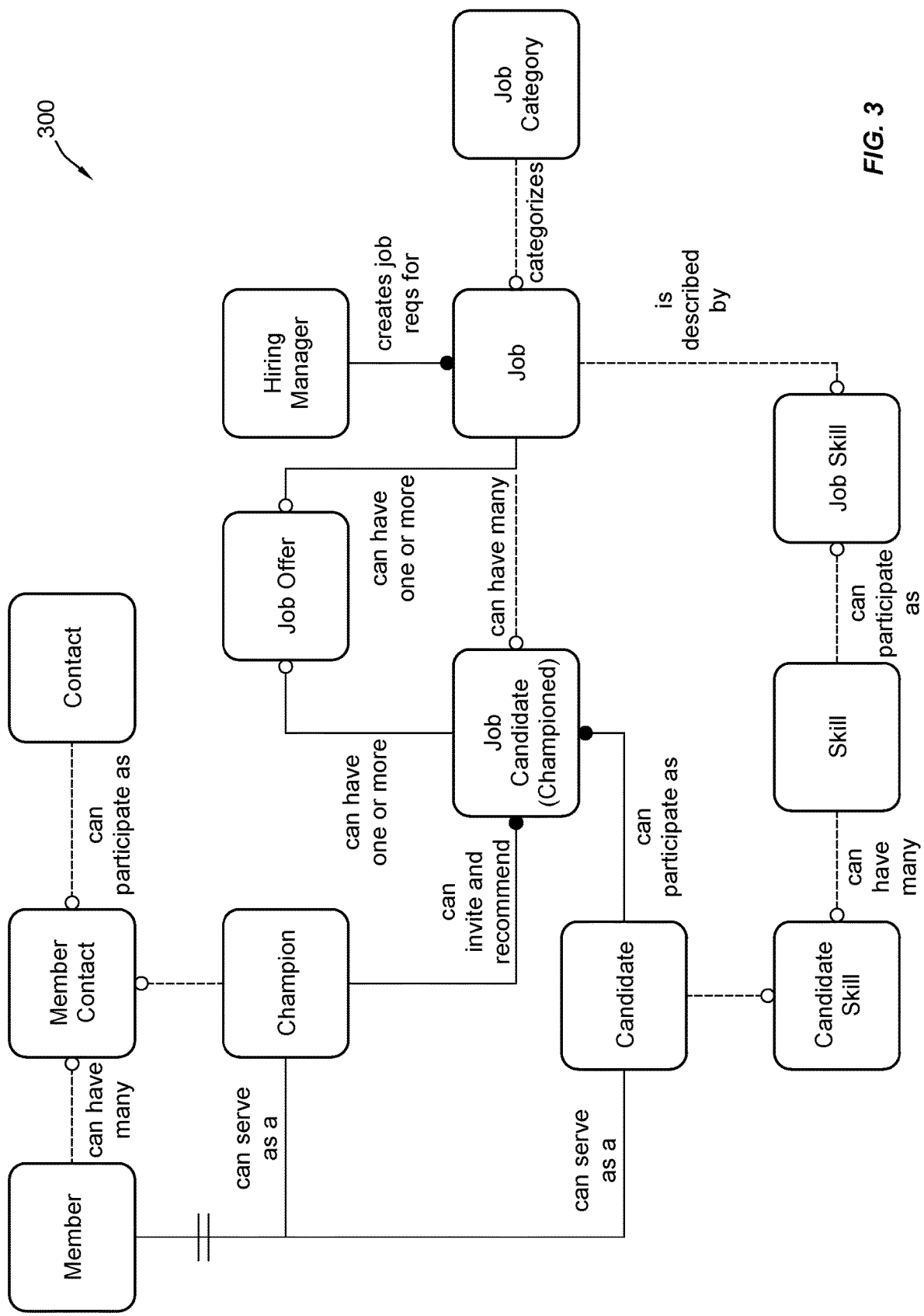
FIG. 3 illustrates an entity relationship diagram according to certain embodiments of this disclosure.

FIG. 3 illustrates an entity relationship diagram 300 according to certain embodiments of this disclosure. This figure describes the entities involved in the matching of job seekers (candidates) to known contacts who might refer them (referrers). The entity Job Candidate represents the temporal state of a job seeker where a pairing of Job, Candidate and Champion are held and where the referrer score would be attributed. In some embodiments, each entity may represent a table containing columns where values would be stored in rows.

Figure 4:
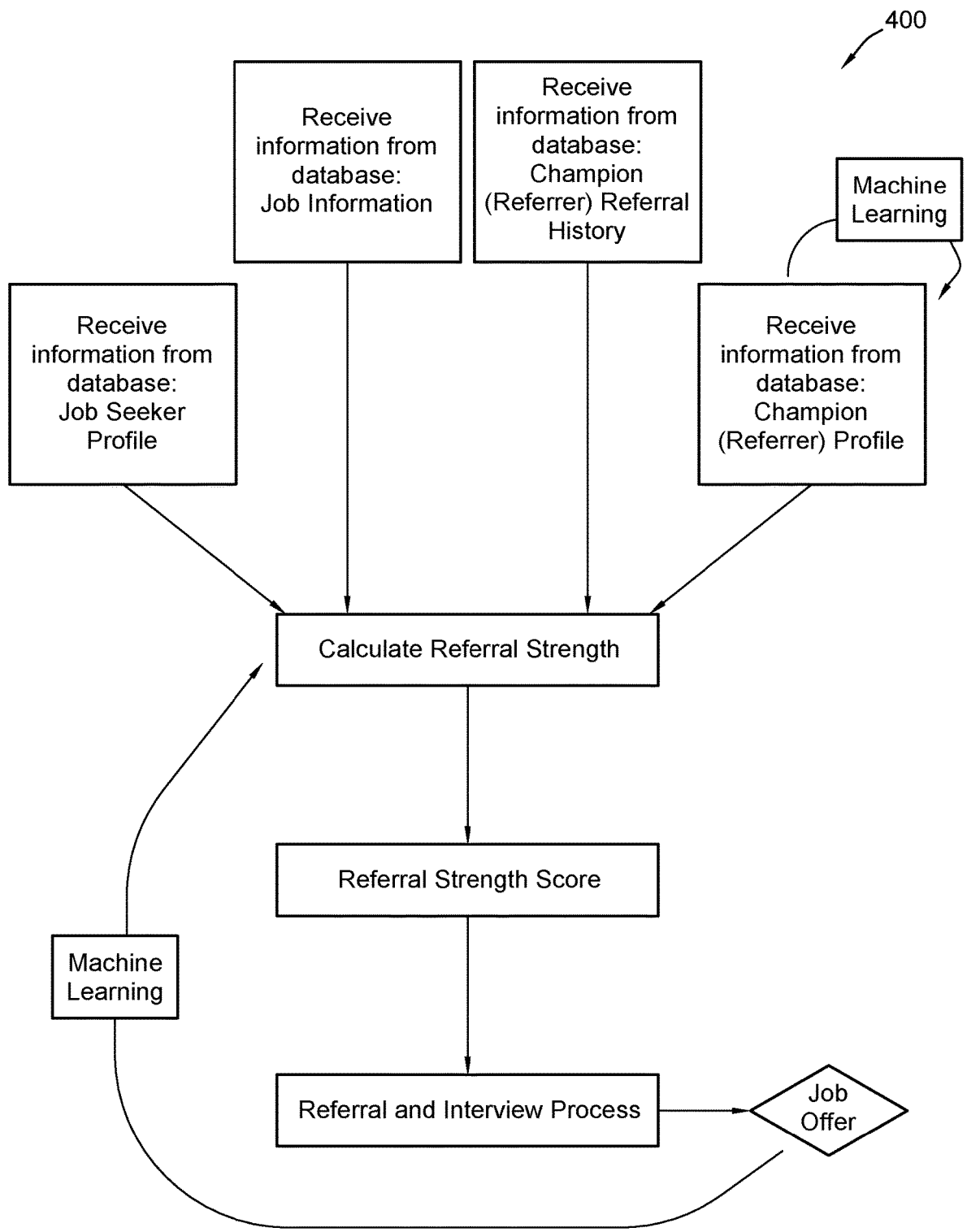
FIG. 4 illustrates a flow diagram for determining a referral score according to certain embodiments of this disclosure.

FIG. 4 illustrates a flow diagram 400 for determining a referral score according to certain embodiments of this disclosure. The figure describes a process whereby inputs are received from at least four sources, used as inputs for calculation, then an output is created in the form of a scalar 0-100. In some embodiments, the process may be implemented in computer instructions and executed by a processing device to read from at least four database tables, stored in non-volatile disk. The processing device may create a single scalar score used to signify the probability that a referrer can successfully refer a particular candidate for a job. Based on experience and history of similar referral processes over time, machine learning models may modify elements of the algorithm to improve the effectiveness of the prediction. In some embodiments, certain inputs, such as the input from the Champion profile (Referrer's success) may improve with machine learning in both their accuracy representing professional success and their referent power related to this process.

In some embodiments, the referral strength may be determined by a referrer score (referral strength score) that is calculated using one or more codified values having weighted coefficients. The weighted coefficients may be determined based on which of the codified values are most desirable for the candidate, referrer, and/or hiring entity. The codified values may relate to an occupation (e.g., of the candidate and/or referrer), an experience (e.g., of the candidate and/or referrer), and/or a location. The codified values may be generated based on performing natural language processing on a corpus of job requisition data obtained from various sources (e.g., websites, social networks, databases, etc.) to determine a frequency of certain keywords and/or a relevancy of certain keywords.

FIGS. 5-25 depict various user interfaces of the platform hosted by the cloud-based computing system 116.

FIG. 5 illustrates a user interface 500 depicting a contact center according to certain embodiments of this disclosure. The contact center may be generated and provided to a computing device 12, 13, and/or 15 as further described herein. As depicted, job matches are determined for each of the contacts in the contact center. The user may select one of the contacts to invite the contact to join the platform and/or to inform the contact of one or more job matches. The user may also use the user interface to send a message to a contact requesting to be a referrer for the contact for one or more job matches.

FIG. 6 illustrates a user interface 600 depicting options to set up a company, invite employees, and create a job requisition according to certain embodiments of this disclosure. The user may set up company details and payment information, which may be required information/steps for publishing job requisitions. The user may invite employees to the platform, which may give a stronger network of candidates to pull from and may increase chances of finding a desirable match. The user may create and publish a job requisition and start finding candidates. In some embodiments, the company may need to be set up prior to creating the job requisition.

FIG. 7 illustrates a user interface 700 for uploading contact information for employees to join the platform according to certain embodiments of this disclosure. The user interface 700 includes a graphical box that enables dragging and dropping files into the graphical box. Additionally, a button may be selected to browse a file directory to find a file that includes a list of employees. The user may upload a list of employees to the platform to add the employees to a contact center and to enable the employees to recruit other candidates from their networks.

FIG. 8 illustrates a user interface 800 for inviting employees to join the platform according to certain embodiments of this disclosure. The user interface 800 shows the list of employee contacts that were imported from the files the user uploaded via the user interface 700. The user may select one or more of the contacts and generate a message to send to invite the selected contacts.

Figure 9:
FIG. 9 illustrates a user interface for creating a job requisition and predicted information pertaining to the job according to certain embodiments of this disclosure.

FIG. 9 illustrates a user interface 900 for creating a job requisition and predicted information pertaining to the job according to certain embodiments of this disclosure. The user interface 900 may include a section to add basic job requisition information, such as a company name, a job title, a department, a description, a preferred candidate to see the job requisition, etc. Further, the user interface 900 may include a portion that includes predicted numbers generated by one or more machine learning models. The predicted numbers may pertain to how the platform expects the job requisition to perform. The machine learning models may be trained based on a corpus of training data including inputs related to other job requisitions having similar characteristics and outputs related to how those job requisitions performed. For example, the predicted numbers include a predicted number of candidates that may match with the job requisition, a predicted number of referrals that may be received from referrers for the job requisition, a predicted number of applications that may be received from candidates, a predicted number of interviews, and/or a predicted number of possible acceptances. The information entered via the user interfaces may be used in the calculation performed by the one or more machine learning models generating the predicted numbers.

FIG. 10 illustrates another user interface 1000 for creating a job requisition and predicted information pertaining to the job according to certain embodiments of this disclosure. The additional information pertaining to the job requisition may include personality characteristics, education and work, and the like. In some embodiments, the user may filter out applications who haven't attended certain schools or who haven't worked at certain companies. The information entered via the user interfaces may be used in the calculation performed by the one or more machine learning models generating the predicted numbers.

Figure 11:
FIG. 11 illustrates another user interface for creating a job requisition and predicted information pertaining to the job according to certain embodiments of this disclosure.

FIG. 11 illustrates another user interface 1100 for creating a job requisition and predicted information pertaining to the job according to certain embodiments of this disclosure. The user may select various skills and experiences that are desired for the job requisition using the user interface 1100. Further, the user may provide one or more incentives (e.g., a champion incentive, a candidate incentive, an employee referral bonus, etc.) that are associated with the job requisition. The information entered via the user interfaces may be used in the calculation performed by the one or more machine learning models generating the predicted numbers.

FIG. 12 illustrates a user interface 1200 for previewing candidate matches for a job requisition according to certain embodiments of this disclosure. The user interface 1200 depicts a statement "Based on the criteria you've entered into the job requisition, these are some matches from the Talinity network. Note that matches are anonymized until Champions begin referring them to you." For example, the hiring entity that created the job requisition may be presented with a list of job matches and associated referral strength in the score. A "Sales Representative" in Atlanta, WA is ranked first with a score of 97.

FIG. 13 illustrates a user interface 1300 for presenting job requisitions according to certain embodiments of this disclosure. The user interface 1300 includes a dashboard presenting the various job requisitions that a hiring entity or recruiter has created using the platform (e.g., "Talinity"). For example, the first job requisition is titled "Sales Representative" and the job status indicates this job requisition has been shared 346 times, referred 68 times, and received 60 application requests. There is also a link that enables the user to view all referred candidates, which once selected, may redirect the computing device of the user to FIG. 14.

FIG. 14 illustrates a user interface 1400 for presenting referrals for a job according to certain embodiments of this disclosure. The user interface 1400 includes a list of candidates (e.g., Justin Davis, Mollie Bradfor, Bryan Herren, etc.) that have been referred for the job requisition of "Sales Representative". Each referred candidate may be associated with information presented in a respective portion (e.g., tile) of the user interface 1400. Each candidate may be associated with a job match score. For example, Justin Davis has a job match score of 87, and he is ranked first in the list, and therefore presented more prominently in the user interface 1400 in relation to the other candidates in the list. If the user selects the tile associated with Justin Davis, the computing device may redirect the user to FIG. 15.

Figure 15:
FIG. 15 illustrates a user interface for presenting a particular candidate for a job and a chat interface between a hiring entity and a referrer according to certain embodiments of this disclosure.

FIG. 15 illustrates a user interface 1500 for presenting a particular candidate for a job and a chat interface between a hiring entity and a referrer according to certain embodiments of this disclosure. The user interface 1500 depicts a portion of presenting additional information related to Justin Davis. Further, the user may select an applicant status, such as "Waiting on application," from a dropdown menu.

Additionally, the user interface 1500 may include a portion that presents information related to the referrer or champion that referred Justin Davis for the job requisition. As depicted, Michael Chea referred Justin Davis. An official recommendation from Michael Chea states "Justin is one of the best sales reps and I know. He transforms the sale departments for organizations into highly efficient and tuned machines." The hiring entity may be presented with a graphical element that enables writing a message to the referrer and transmitting the message to the computing device of the referrer.

Figure 16:
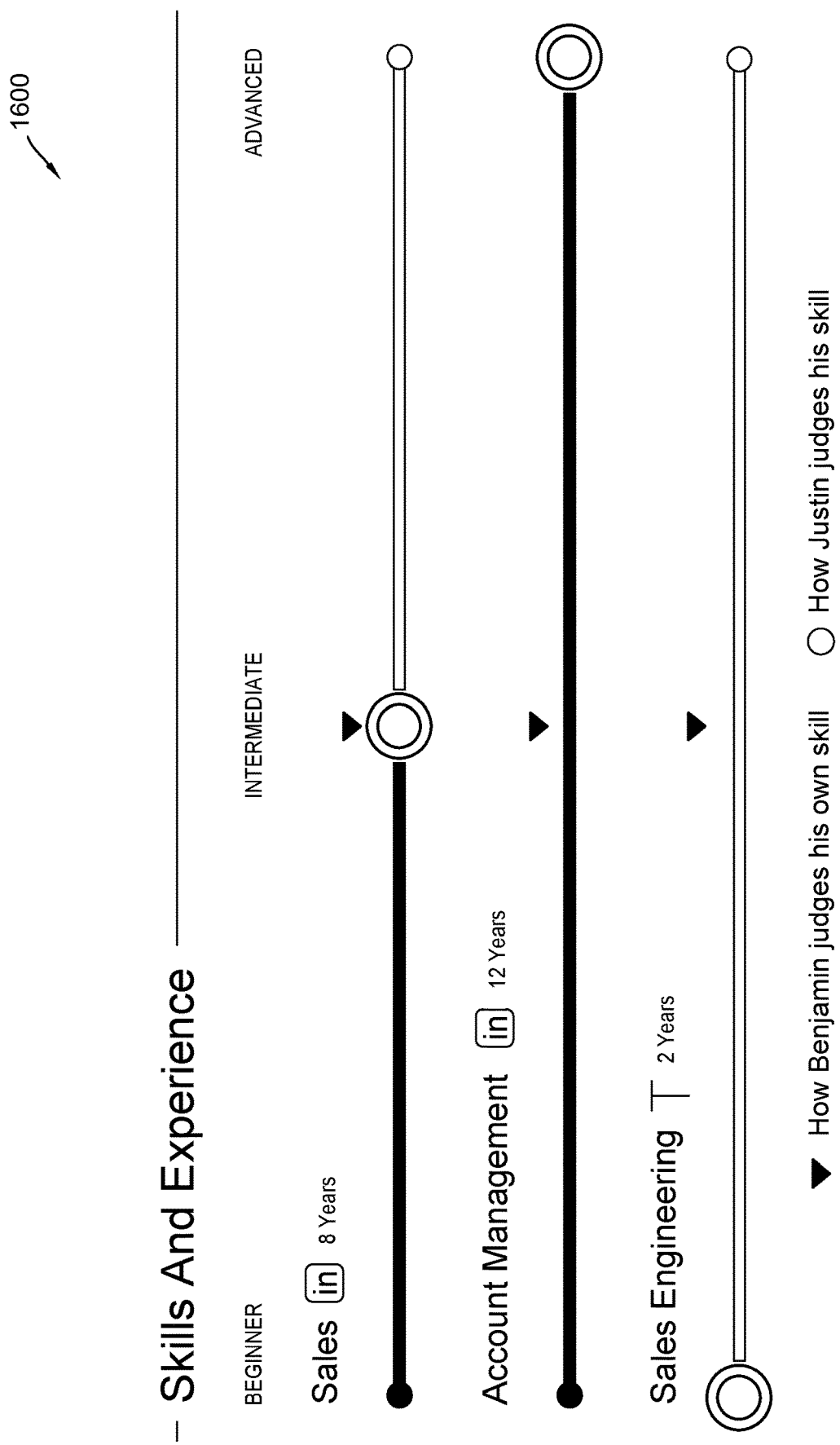
FIG. 16 illustrates a user interface for creating a profile using information imported from a third-party source according to certain embodiments of this disclosure.

FIG. 16 illustrates a user interface 1600 for creating a profile using information imported from a third-party source according to certain embodiments of this disclosure. In the user interface, various graphical elements are depicted that indicate a level (beginner, intermediate, advanced) that the candidate judged for his own skill regarding sales, account management, and sales engineering.

FIG. 17 illustrates a user interface 1700 for inviting a person to become a member of the platform according to certain embodiments of this disclosure. The user interface 1700 includes a message from a referrer where the referrer provides information about the platform and the incentives provided by the platform. Further, the message indicates a job posting is available for which the referrer thinks the candidate would be a good fit. The message also indicates that the referrer would like to refer the candidate for the job posting and includes a link for the candidate to learn more about the job posting.

FIG. 18 illustrates a user interface 1800 for a member to choose to get referred for a job or to refer a friend for the job according to certain embodiments of this disclosure. As depicted, if the candidate selects the link presented in the user interface 1700, the computing device of the candidate is redirected to the user interface 1800. The user interface 1800 includes more information about the job posting and includes various graphical elements that enable the candidate to select to get referred for the job or to refer one or more friends for the job. The candidate selected the graphical element to get referred for the job.

FIG. 19 illustrates a user interface 1900 for a member set up their account according to certain embodiments of this disclosure. The user interface 1900 includes options for one or more application programming interfaces to upload data from a social network, such as LinkedIn®. If the user selects an option to upload data from the social network, the platform may use the profile data from the social network, may enable the user to refer and be referred by contacts in the social network, may suggest jobs for the candidate to share with their contacts, may suggest contacts to request referrals from for each job the candidate matches with. In some embodiments, the user may upload their resume or setup their profile manually.

FIG. 20 illustrates a user interface 2000 for uploading data from a third-party source according to certain embodiments of this disclosure. The user interface 200 includes graphical elements that enable the user to upload their social network data via one or more files. In some embodiments, the platform may execute one or more software applications that perform screen scraping techniques to obtain the data from the website or software application associated with the social network.

FIG. 21 illustrates a user interface 2100 for presenting a job and friends and/or contacts that are able to be referrers according to certain embodiments of this disclosure. The user interface 2100 shows a job posting selected by a candidate. Further, the user interface 2100 presents a list of referrers that can refer the candidate for the job posting. The list of referrers may be generated based on a referrer score as discussed herein.

FIG. 22 illustrates a user interface 2200 for presenting opportunities for a referrer according to certain embodiments of this disclosure. The user interface 2200 presents a home screen showing a list of opportunities (job postings) that have been matched for the candidate. In some embodiments, the list of job postings may be sorted based on a job match score determined via one or more codified values for occupation, experience, and/or location. Further, for each of the job postings, a list of potential referrers is displayed, and the referrers are determined based on a referrer score for each job posting and referrer.

FIG. 23 illustrates a user interface 2300 for sharing a particular job to a particular candidate according to certain embodiments of this disclosure. The user interface 2300 may be presented on a computing device associated with a referrer or champion. The user interface 2300 includes a list of job postings that the referrer can share with one or more candidates in a contact center. The user interface 2300 includes respective portions (e.g., tiles) for each job posting that can be shared. The candidates that are presented are ranked and presented in an order prioritized by the referral strength score (e.g., referrer score) determined between the referrer and the candidate for a particular job posting. Further, the amount of the incentive the referrer receives if the referrer recommends the candidate and the candidate is hired.

FIG. 24 illustrates a user interface 2400 for recommending a job for a candidate that is interested in the job according to certain embodiments of this disclosure. In some embodiments, once the job is shared with a candidate (e.g., Celia Marshall), and the candidate allows the referrer to refer the candidate for the job posting, the user interface 2400 may be presented. The user interface 2400 shows a list of referrals for the referrer. The referrer may select a graphical element that enables the referrer to recommend the candidate for the job posting.

FIG. 25 illustrates a user interface 2500 comparing skills required for a job and the skills of a candidate according to certain embodiments of this disclosure. If the referrer choose to recommend the candidate (e.g., Celia), the user interface 2500 presents Celia's skill levels as determined by Celia in comparison with the skills required for the job. The referrer may select to write the recommendation for Celia and the recommendation may be transmitted to the hiring entity associated with the job posting.

Figure 26:
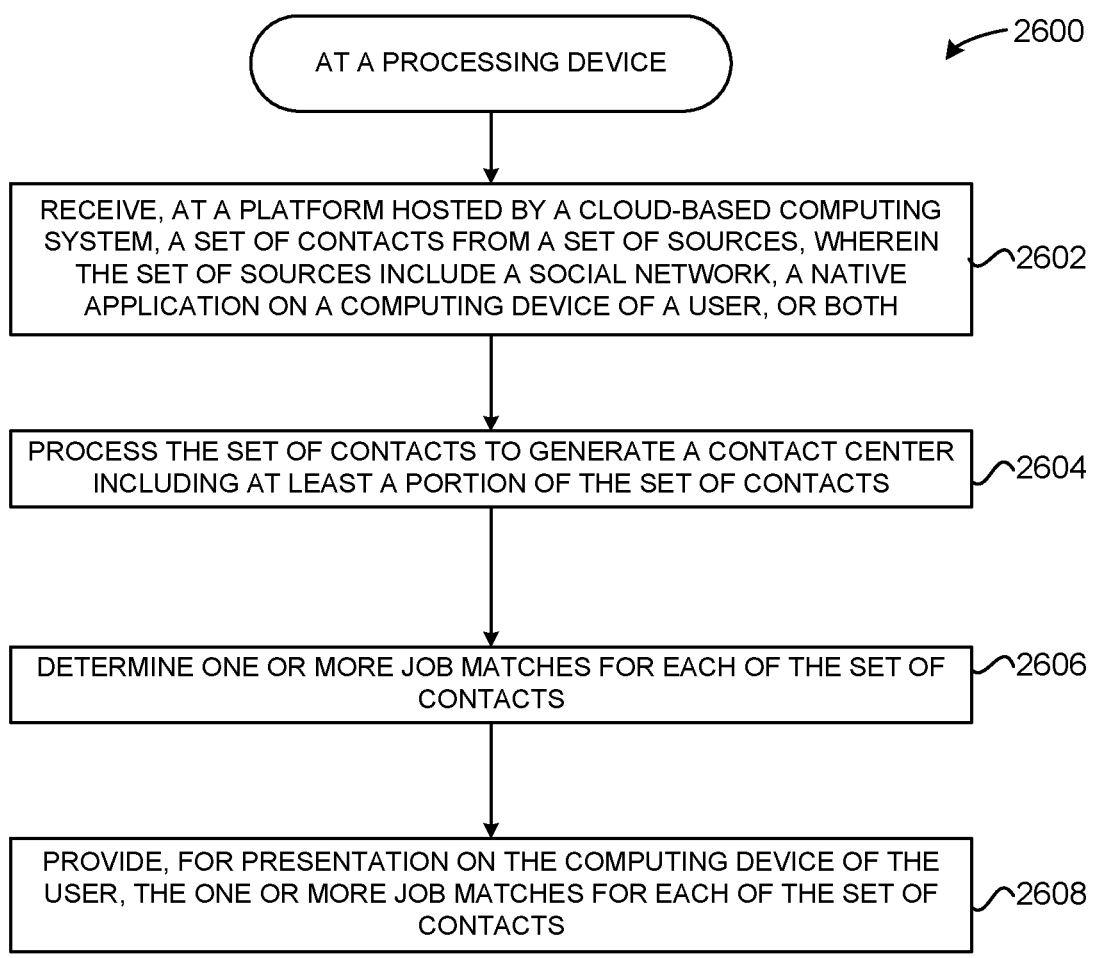
FIG. 26 illustrates an example of a method for generating a contact center and providing job matches for contacts in the contact center according to certain embodiments of this disclosure.

FIG. 26 illustrates an example of a method 2600 for generating a contact center and providing job matches for contacts in the contact center according to certain embodiments of this disclosure. The method 2600 may be performed by processing logic that may include hardware (circuitry, dedicated logic, etc.), software, or a combination of both. The method 2600 and/or each of their individual functions, subroutines, or operations may be performed by one or more processors of one or more computing devices (e.g., any component (server 128, training engine 152, machine learning models 154, etc.) of cloud-based computing system 116 and/or computing device 12, 13, 15 of FIG. 1) implementing the method 2600. The method 2600 may be implemented as computer instructions stored on one or more memory devices and executable by the one or more processors. In certain implementations, the method 2600 may be performed by a single processing thread. Alternatively, the method 2600 may be performed by two or more processing threads, each thread implementing one or more individual functions, routines, subroutines, or operations of the methods.

At block 2602, the processing device may receive, at a platform hosted by a cloud-based computing system 116, a set of contacts (e.g., list of names, email addresses, identifiers, phone numbers, IP addresses, etc.) from a set of sources. The set of sources may include one or more social networks (e.g., Instagram®, Facebook®, LinkedIn®, etc.), a native application (e.g., contacts application stored contacts on a smartphone) of a computing device 12 of a user, etc. In some embodiments, the platform may be communicatively coupled to one or more application programming interfaces (APIs) of the one or more sources, such that the platform is interoperable with one or more systems, programs, services, etc. exposed via the APIs for the one or more sources. In some embodiments, the processing device may transmit a function call to the APIs to retrieve the contact information. In some embodiments, the contact information may be uploaded as one or more file types (e.g., CSV, XML, etc.) into a graphical element on a user interface presented on a computing device 12 of the user.

At block 2604, the processing device may process the set of contacts to generate a contact center including at least a portion of the set of contacts. One example contact center is depicted in FIG. 5. In some embodiments, the processing device may receive a selection to invite a contact to join the platform. The contact may be included in the contact center. The processing device may transmit an invitation to a computing device 12 of the contact. In some embodiments, processing the set of contacts may include merging the set of contacts (e.g., two contact lists received from two different sources (a social network and a phone) by appending one set of contact with another set of contact. Further, processing the set of contacts may include de-duplicating contacts from the merged set of contacts. De-duplicating the contacts may include identifying contacts that share the same information and deleting all but one instance of the contact from the merged contact list.

At block 2606, the processing device may determine one or more job matches for each of the set of contacts. The processing device may use a trained machine learning model 154 to determine the one or more job matches. For example, the trained machine learning model may be trained to receive inputs including information pertaining to jobs (e.g., skills required, experience required, amount of pay, type of job, job title, geographic location, etc.) and candidates (e.g., skills possessed, experience possessed, desired amount of pay, desired type of job, desired job title, desired geographic region, etc.), and to output a probability metric indicating a level of match between jobs and the candidates. The processing device may generate a job match score for each contact and each job. The job match score may be based on one or more codified values related to an occupation, experience, and/or location selected by the contact. For example, the contact may select a "Nurse" as an occupation and "RN" as a license for a skill and "within 5 miles" for a location. The job match scores may be generated based on the selected codified values for the contact. In some embodiments, a machine learning model may be trained to generate the job match score for the candidate and a job.

At block 2608, the processing device may provide, for presentation on the computing device 12 of the user, the one or more job matches for each of the set of contacts. The user may select to send a message to any of the contacts, where the message pertains to the one or more job matches. Further, the message may include a note indicating the user would like to be a referrer for the contact for one or more of the job matches. In some embodiments, a referrer score may be generated by a machine learning model for the contact and the user (e.g., referrer). The referrer score may be determined similarly as the job match score but the referrer score may account for a network distance between the referrer and the hiring entity and/or job.

If the contact responds with an acceptance in allowing the user to be a referrer, the user may transmit a recommendation for the contact to the particular hiring entity associated with the job match. As discussed herein, there may be monetary incentives and/or other incentives (e.g., discounts, coupons, subscriptions, etc.) offered to both the contact (e.g., candidate) and/or the user (e.g., referrer) for participating in the hiring process. For example, each participant (e.g., candidate and/or referrer) may receive a certain amount of money if the candidate is hired by the hiring entity based on the referral from the referrer).

In some embodiments, responsive to determining a contact in the contact center is a member of the platform, the processing device may receive a selection refer the contact to a job match of the one or more job matches. The selection may cause a notification to be transmitted to a computing device 15 of a hiring entity associated with the job match, the computing device 12 of the contact (e.g., candidate), or both.

In some embodiments, the processing device may determine, using a trained machine learning model 154, a set of referrer scores for the user (e.g., referrer) for the one or more or more job matches for each of the set of contacts. In particular, a referrer may receive a referrer score for each instance of a job and a particular job posting, and the referrer score may also be associated with a strength of the referrer referring a particular candidate for the particular job posting. As described herein, the referrer score may be determined based on a number of factors that are continuously tuned and updated over time as more data is received pertaining to the referrer, the candidate, and/or the job postings. Such continuous and/or continual updating of the machine learning model 154 determining the referrer score may be referred to as a referral feedback loop. In some embodiments, the job title (which is included in a job requisition), an occupation (which is entered by a candidate), and experience characteristics may be processed via one or more machine learning loops to handle out-of-tolerance frequencies. For example, the machine learning loops may be continuously tuned and updated over time as more data is received to accurately map job titles with occupations and/or experience characteristics of candidates. Further, the tuning and updating loop may enable enhanced matching between candidate and job postings, referrer and candidate, etc. The enhanced matching accuracy may provide enhanced conversion rates of candidates to new hires for the job postings based on referrals from the referrers.

The processing device may provide the set of referrer scores with the one or more job matches for each of the set of contacts. The processing device may receive, from a computing device 13 of a referrer, a selection to be a referrer for a contact of the plurality of contacts matched with at least one job. The processing device may transmit a notification to a computing device 12 of the contact (e.g., candidate), wherein the notification requests acceptance of the referrer for the contact. Responsive to receiving the acceptance from the computing device 12 of the contact, the processing device may transmit a recommendation to a computing device of a hiring entity associated with the at least one job.

In some embodiments, the processing device may use one or more trained machine learning models 154 to determine a probability (e.g., predict) pertaining to whether the one or more job matches for each of the set of contacts will result in a hiring event. The trained machine learning models 154 may also determine a predicted number of candidates that may be matched for a job posting, a number of referrals that may be received for candidates for the job posting, a number of applications that may be received for the job posting, a number of interviews that may be conducted for the job posting, and/or a number of possible acceptances that may be received from candidates for the job posting. The machine learning model 154 may be trained based on a corpus of training data pertaining to similar job postings and/or candidates and the outcomes (e.g., number of candidates, number of referrals, number of applications, number of interviews, and/or number of possible acceptances) for those job postings and/or candidates. Such a predictive algorithm may be beneficial as it provides insights to the hiring entity whether there is a demand for their job posting, how quickly their job posting will be filled, and/or a likelihood of their job posting being filled. If the predictions are very low (e.g., poor), the hiring entity may determine to not continue with positing their job posting, which may reduce computing resources by deleting the job posting. On the other hand, if the predictions are very high, the hiring entity may continue to post the job requisition, and the job may be filled very quickly due to high demand and a lot of good candidates. Accordingly, computing resources may be reduced because the job posting is filled quickly and removed from the application and/or website.

Figure 27:
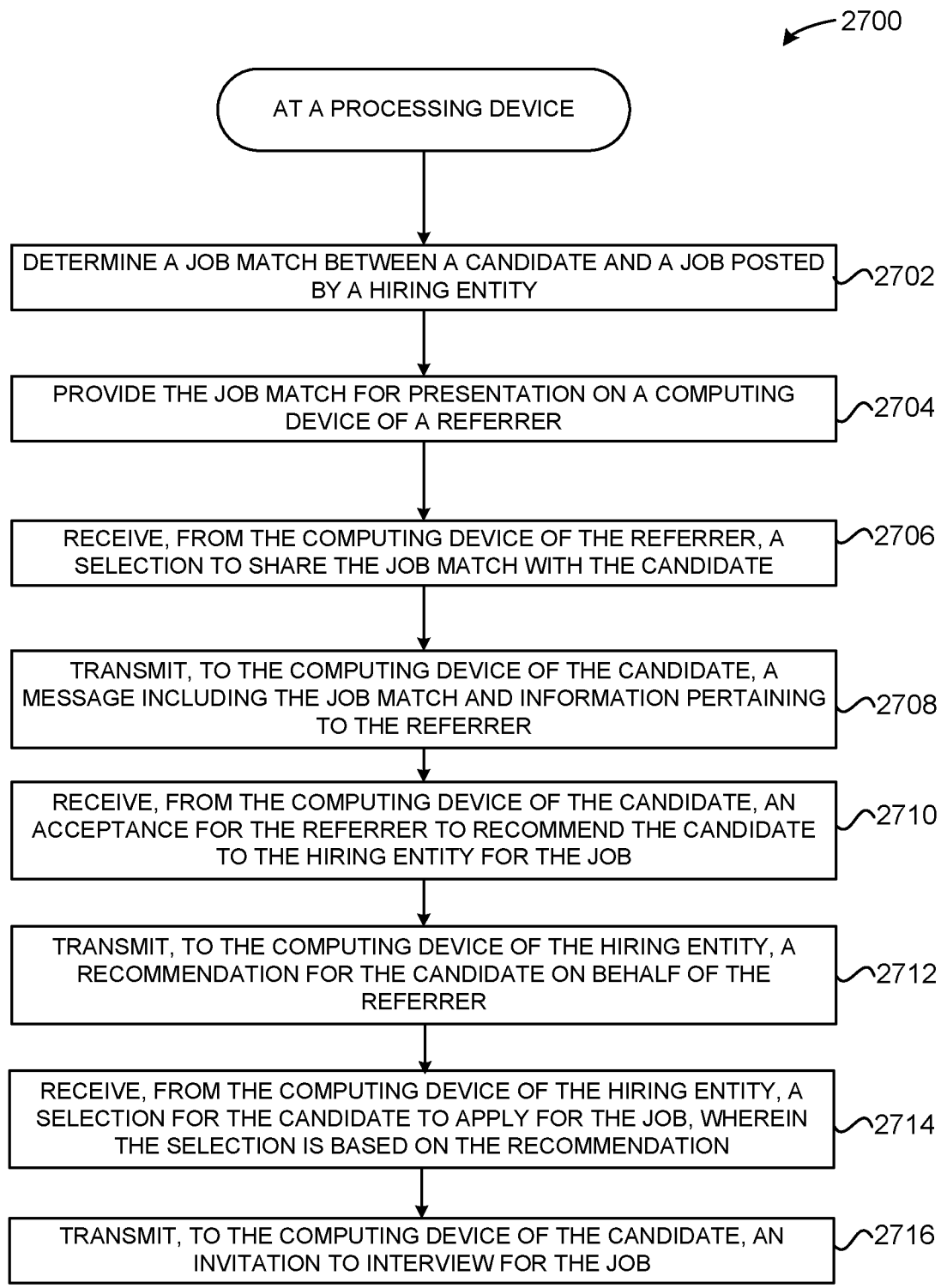
FIG. 27 illustrates an example of a method for a three-party system for recruiting a candidate via a referrer according to certain embodiments of this disclosure.

FIG. 27 illustrates an example of a method 2700 for a three-party system for recruiting a candidate via a referrer according to certain embodiments of this disclosure. The method 2700 may be performed by processing logic that may include hardware (circuitry, dedicated logic, etc.), software, or a combination of both. The method 2700 and/or each of their individual functions, subroutines, or operations may be performed by one or more processors of a computing device (e.g., any component (server 128, training engine 152, machine learning models 154, etc.) of cloud-based computing system 116 and/or computing device 12, 13, 15 of FIG. 1) implementing the method 2700. The method 2700 may be implemented as computer instructions stored on a memory device and executable by the one or more processors. In certain implementations, the method 2700 may be performed by a single processing thread. Alternatively, the method 2700 may be performed by two or more processing threads, each thread implementing one or more individual functions, routines, subroutines, or operations of the methods.

At block 2702, the processing device may determine a job match between a candidate and a job posted by a hiring entity. At block 2704, the processing device may provide the job match for presentation on a computing device 13 of a referrer. At block 2706, the processing device may receive, from the computing device 13 of the referrer, a selection to share the job match with the candidate. At block 2708, the processing device may transmit, to the computing device 12 of the candidate, a message including the job match and information pertaining to the referrer. At block 2710, the processing device may receive, from the computing device 12 of the candidate, an acceptance for the referrer to recommend the candidate to the hiring entity for the job. At block 2712, the processing device may transmit, to the computing device 15 of the hiring entity, an acceptance for the referrer to recommend the candidate for the job to the hiring entity. At block 2714, the processing device may receive, from the computing device 15 of the hiring entity, a selection for the candidate to apply for the job. The selection may be based on the recommendation from the referrer. At block 2716, the processing device may transmit, to the computing device 13 of the candidate, an invitation to interview for the job.

In some embodiments, the processing device may determine a referrer score for the referrer. The referrer score is associated with a relationship between the candidate and the referrer, and the referrer score is based on an occupation, an experience, a location of the job, or some combination thereof. In some embodiments, the processing device may perform natural language processing on a corpus of data to determine one or more frequencies one or more keywords are used in the data. In some embodiments, the processing device may select, based on the frequency, a portion of the one or more keywords as selections for the occupation, the experience, the location of the job, or some combination thereof. In some embodiments, the processing device may use a trained machine learning model to determine the referrer score.

In some embodiments, the processing device may determine a job match score for the candidate, wherein the job match score is associated with a relationship between the candidate and the job, and the job match score is based on an occupation, an experience, a location of the job, or some combination thereof. In some embodiments, the processing device may perform natural language processing on a corpus of data to determine one or more frequencies one or more keywords are used in the data. In some embodiments, the processing device may select, based on the frequency, a portion of the one or more keywords as selections for the occupation, the experience, the location of the job, or some combination thereof. In some embodiments, the processing device may use a trained machine learning model to determine the job match score.

Figure 28:
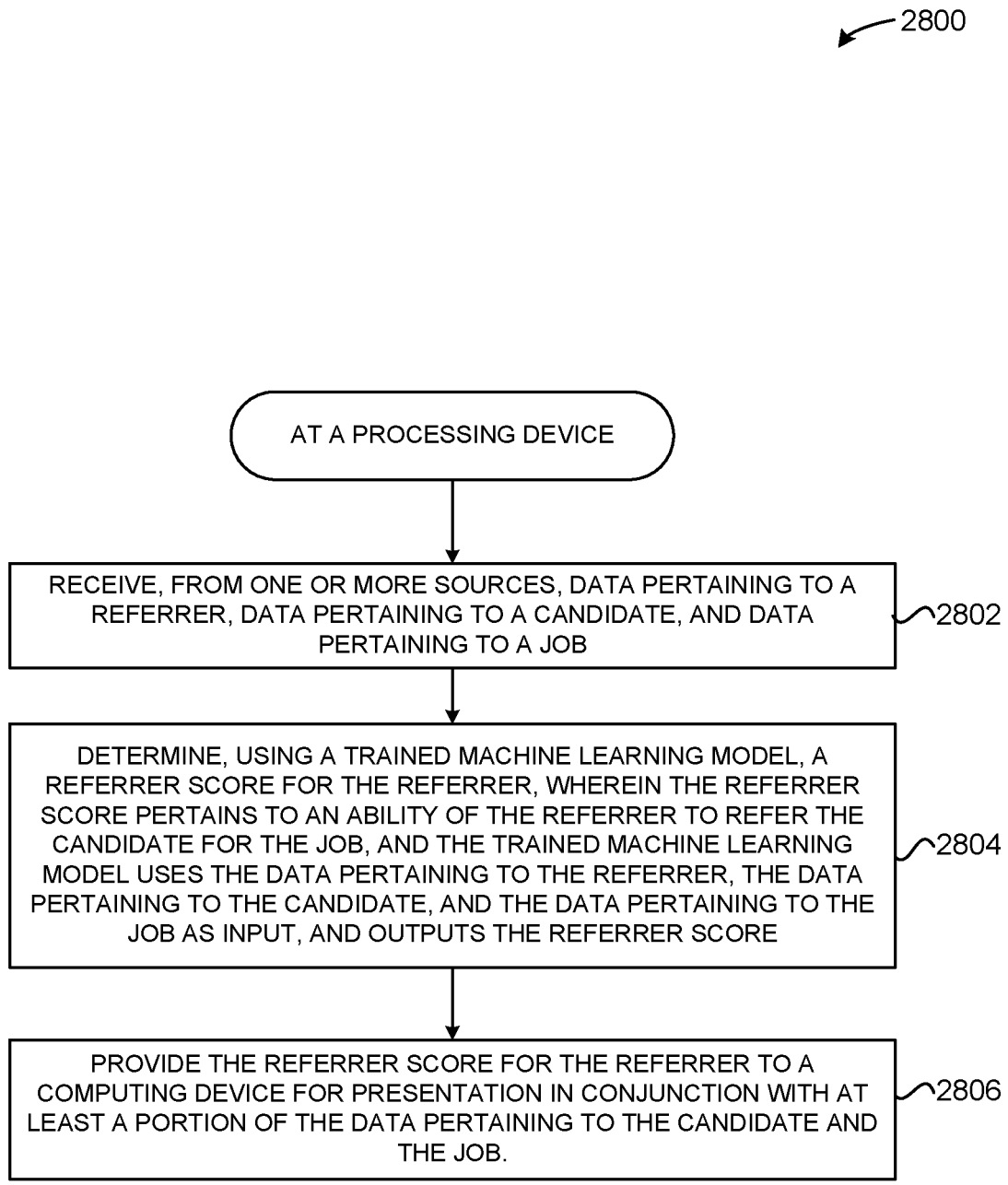
FIG. 28 illustrates an example of a method for a determining a referrer score according to certain embodiments of this disclosure.

FIG. 28 illustrates an example of a method for a determining a referrer score according to certain embodiments of this disclosure. The method 2800 may be performed by processing logic that may include hardware (circuitry, dedicated logic, etc.), software, or a combination of both. The method 2800 and/or each of their individual functions, subroutines, or operations may be performed by one or more processors of a computing device (e.g., any component (server 128, training engine 152, machine learning models 154, etc.) of cloud-based computing system 116 and/or computing device 12, 13, 15 of FIG. 1) implementing the method 2800. The method 2800 may be implemented as computer instructions stored on a memory device and executable by the one or more processors. In certain implementations, the method 2800 may be performed by a single processing thread. Alternatively, the method 2800 may be performed by two or more processing threads, each thread implementing one or more individual functions, routines, subroutines, or operations of the methods.

At block 2802, the processing device may receive, from one or more sources, data pertaining to a referrer, data pertaining to a candidate, and data pertaining to a job. The data may be received from an application programming interface, service, system, or the like of a third-party application or website (e.g., a social network, a computing device (smartphone), etc.). In some instances, the data may include missing data, corrupted data, invalid data, duplicate data, and the like. The disclosed techniques may perform data analytics and machine learning techniques to analyze the data to correct the data, populate the data, restore the data, de-duplicate the data, merge the data, etc. Further, the disclosed techniques may receive the data in a first format and transform the data into a standardized format that a trained machine learning model 154 is capable of parsing and processing. This transformation of data process may use proprietary codification that includes various fields and data values. The codification may enable data to be received in any format and transformed into the standard coded data that may be processed by the machine learning model 154 and may also result in a standardized formatted output that is transmitted to and consumable by an application or website executing on the computing device of the candidate, hiring entity, and/or referrer. In other words, the processing device may codify data received in a first format from one or more APIs into a second format compatible with the trained machine learning model 154, where the trained machine learning model 154 may output the referrer score in the second format to an application or website presented on the computing device (e.g., 12, 13, 15).

At block 2804, the processing device may determine, using a trained machine learning model 154, a referrer score for the referrer. The referrer score may pertain to an ability of the referrer to refer the candidate for the job. The machine learning model 154 may use the data pertaining to the referrer (e.g., past success with referrals, firsthand experience together in the workplace, familiarity with the candidate's trade, the referrer's success in the workplace, their knowledge of personality characteristics and strength of connection to the hiring entity, etc.), data pertaining to the candidate (e.g., skills, experience, age, education, personality, etc.), and/or data pertaining to the job (e.g., skills required, experience required, job title, geographic location, etc.) as inputs, and may output the referrer score.

At block 2806, the processing device may provide the referrer score for the referrer to a computing device for presentation in conjunction with at least a portion of the data pertaining to the candidate and/or the job. For example, if the referrer is approved to recommend the candidate, the referrer may use his/her computing device 13 to transmit a recommendation for the candidate for a posted job to a computing device 15 of a hiring entity, and the recommendation may include the referrer score of the referrer, information pertaining to the referrer, information pertaining to the candidate, and information pertaining to the job, which all or partially be presented on the computing device 15 of the hiring entity. The hiring entity may use a user interface to select or the computing device 15 may electronically select the candidate for an interview. Upon the candidate being selected, the computing device 15 of the hiring entity may transmit a message requesting the interview be set up.

Figure 29:
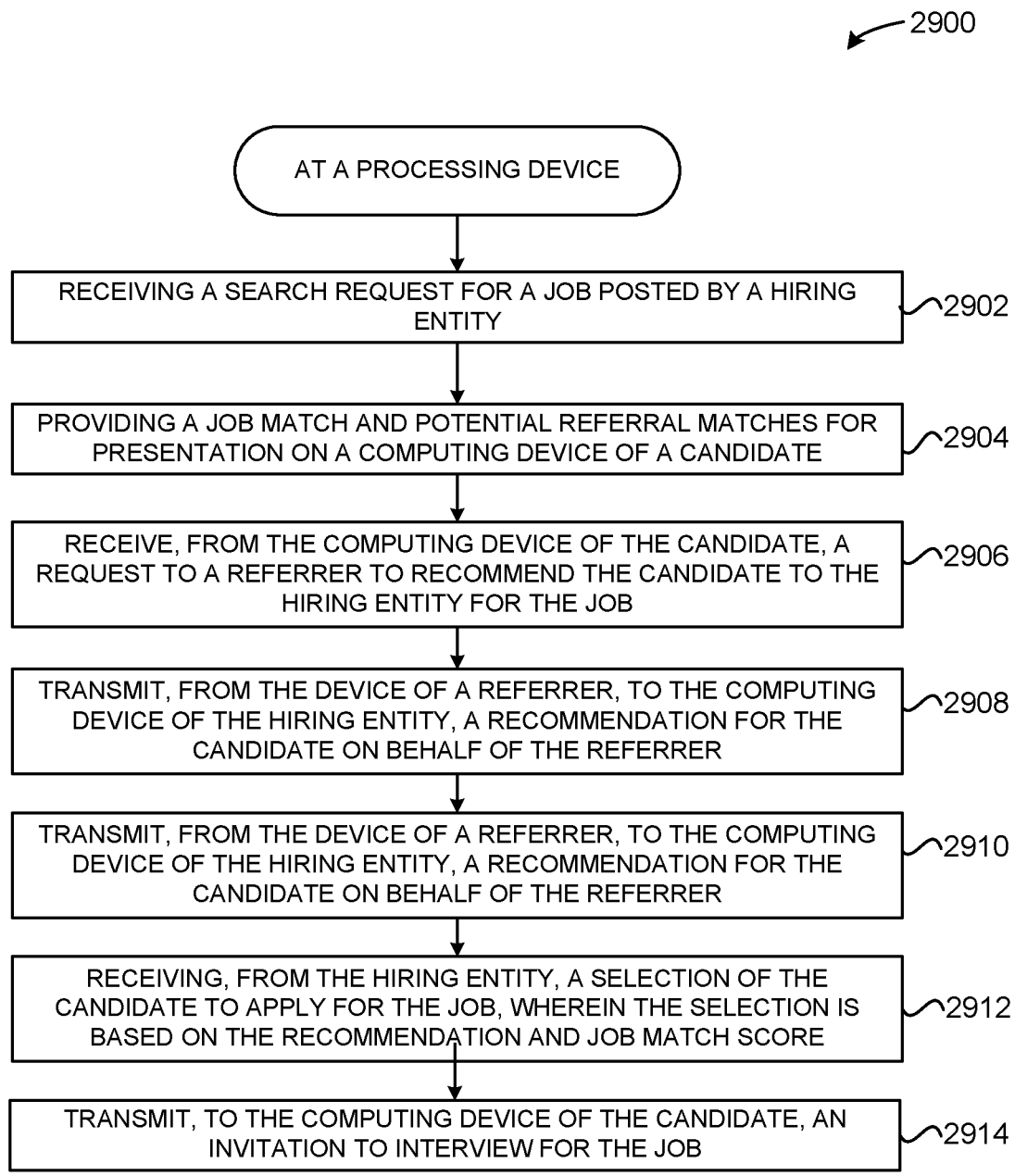
FIG. 29 illustrates an example of a method for candidate to find a job and a referrer to provide a referral to a hiring entity according to certain embodiments of this disclosure.

FIG. 29 illustrates an example of a method 2900 for candidate to find a job and a referrer to provide a referral to a hiring entity according to certain embodiments of this disclosure. The method 2900 may be performed by processing logic that may include hardware (circuitry, dedicated logic, etc.), software, or a combination of both. The method 2900 and/or each of their individual functions, subroutines, or operations may be performed by one or more processors of a computing device (e.g., any component (server 128, training engine 152, machine learning models 154, etc.) of cloud-based computing system 116 and/or computing device 12, 13, 15 of FIG. 1) implementing the method 2900. The method 2900 may be implemented as computer instructions stored on a memory device and executable by the one or more processors. In certain implementations, the method 2900 may be performed by a single processing thread. Alternatively, the method 2900 may be performed by two or more processing threads, each thread implementing one or more individual functions, routines, subroutines, or operations of the methods.

At block 2902, the processing device may receive a search request for a job posted by a hiring entity. At block 2904, the processing device may provide a job match and potential referral matches for presentation on a computing device of a candidate. At block 2906, the processing device may receive, from the computing device of the candidate, a request to a referrer to recommend the candidate to the hiring entity for the job. At block 2908, the processing device may transmit, to the computing device of the hiring entity, a recommendation for the candidate on behalf of the referrer. At block 2910, the processing device may transmit, from the device of a referrer, to the computing device of the hiring entity, a recommendation for the candidate on behalf of the referrer. At block 2912, the processing device may receive, from the hiring entity, a selection of the candidate to apply for the job, where the selection is based on the recommendation and job match score. At block 2914, the processing device may transmit, to the computing device of the candidate, an invitation to interview for the job.

Figure 30:
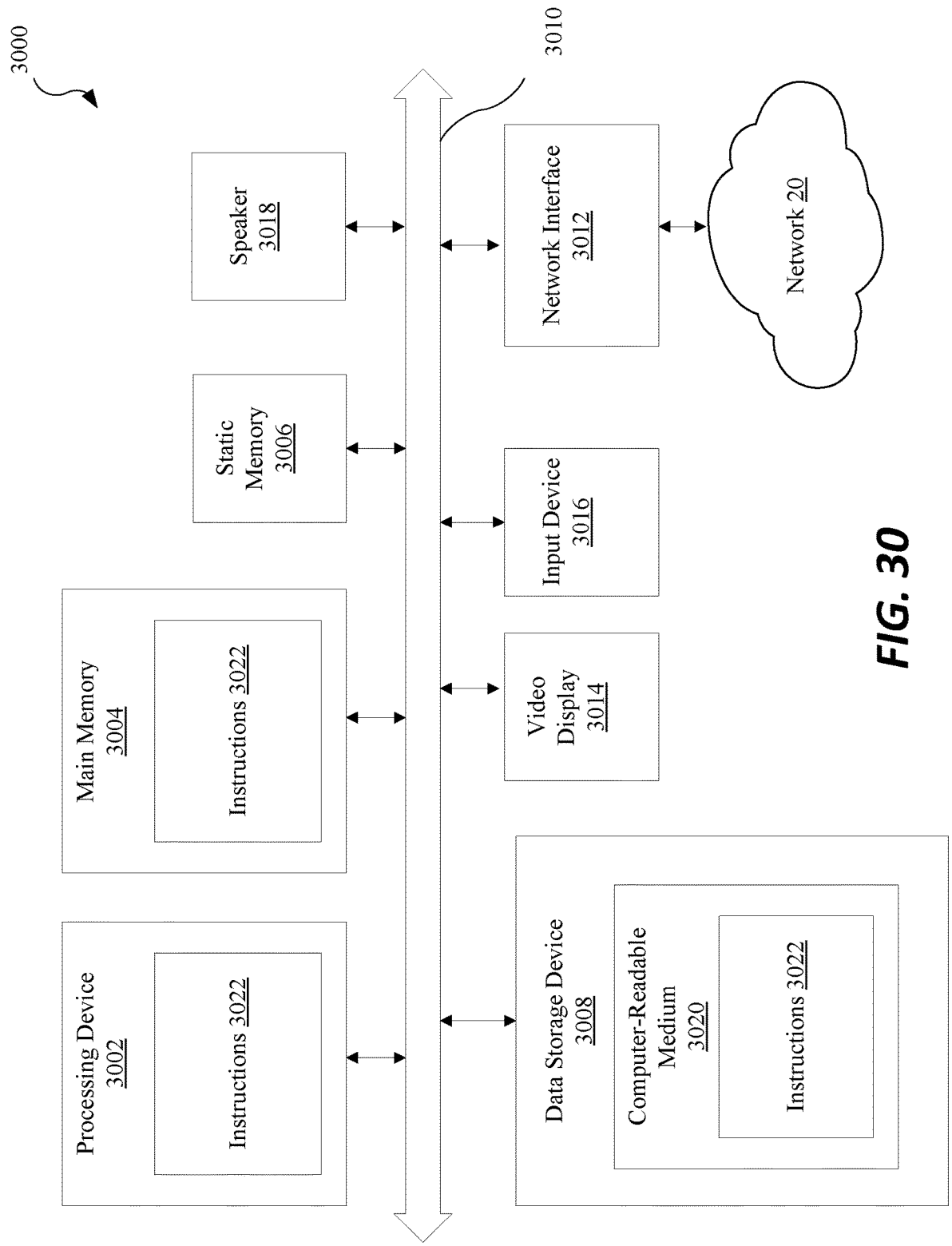
FIG. 30 illustrates an example computer system according to embodiments of this disclosure.

FIG. 30 illustrates an example computer system 3000, which can perform any one or more of the methods described herein. In one example, computer system 3000 may include one or more components that correspond to the computing device 12, the computing device 15, the computing device 13, one or more servers 128 of the cloud-based computing system 116, or one or more training engines 152 of the cloud-based computing system 116 of FIG. 1. The computer system 3000 may be connected (e.g., networked) to other computer systems in a LAN, an intranet, an extranet, or the Internet. The computer system 3000 may operate in the capacity of a server in a client-server network environment. The computer system 3000 may be a personal computer (PC), a tablet computer, a laptop, a wearable (e.g., wristband), a set-top box (STB), a personal Digital Assistant (PDA), a smartphone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 3000 includes a processing device 3002, a main memory 3004 (e.g., read-only memory (ROM), solid state drive (SSD), flash memory, dynamic random access memory (DRAM) such as synchronous DRAM (SDRAM)), a static memory 3006 (e.g., solid state drive (SSD), flash memory, static random access memory (SRAM)), and a data storage device 3008, which communicate with each other via a bus 3010.

Processing device 3002 represents one or more general-purpose processing devices such as a microprocessor, central processing unit, or the like. More particularly, the processing device 3002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 3002 may also be one or more special-purpose processing devices such as an application specific integrated circuit (ASIC), a field programmable gate array (FPGA), a digital signal processor (DSP), network processor, or the like. The processing device 3002 is configured to execute instructions for performing any of the operations and steps discussed herein.

The computer system 3000 may further include a network interface device 3012. The computer system 3000 also may include a video display 3014 (e.g., a liquid crystal display (LCD) or a cathode ray tube (CRT)), one or more input devices 3016 (e.g., a keyboard and/or a mouse), and one or more speakers 3018 (e.g., a speaker). In one illustrative example, the video display 3014 and the input device(s) 3016 may be combined into a single component or device (e.g., an LCD touch screen).

The data storage device 3016 may include a computer-readable medium 3020 on which the instructions 3022 embodying any one or more of the methodologies or functions described herein are stored. The instructions 3022 may also reside, completely or at least partially, within the main memory 3004 and/or within the processing device 3002 during execution thereof by the computer system 3000. As such, the main memory 3004 and the processing device 3002 also constitute computer-readable media. The instructions 3022 may further be transmitted or received over a network 20 via the network interface device 3012.

While the computer-readable storage medium 3020 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

Clauses:

Clause 1. A method comprising:
receiving, at a platform hosted by a cloud-based computing system, a plurality of contacts from a plurality of sources, wherein the plurality of sources comprise a social network, a native application on a computing device of a user, or both;
processing the plurality of contacts to generate a contact center including at least a portion of the plurality of contacts;
determining one or more job matches for each of the plurality of contacts; and
providing, for presentation on the computing device of the user, the one or more job matches for each of the plurality of contacts.

Clause 2. The method of any preceding clause, further comprising:
receiving, at the platform, a selection to invite a contact to join the platform, wherein the contact is included in the contact center;
transmitting an invitation to a computing device of the contact.

Clause 3. The method of any preceding clause, wherein processing the plurality of contacts comprises merging the plurality of contacts and de-duplicating the plurality of contacts.

Clause 4. The method of any preceding clause, further comprising:
responsive to determining a contact in the contact center is a member of the platform, receiving a selection to refer the contact to a job match of the one or more job matches, wherein the selection causes a notification to be transmitted to a computing device of a hiring entity associated with the job match, the computing device of the contact, or both.

Clause 5. The method of any preceding clause, further comprising:
determining, using a trained machine learning model, a plurality of referrer scores for the user associated with the one or more job matches for each of the plurality of contacts;
providing the plurality of referrer scores with the one or more job matches for each of the plurality of contacts;
receiving a selection to be a referrer for a contact of the plurality of contacts matched with at least one job;
transmitting a notification to a computing device of the contact, wherein the notification requests acceptance of the referrer for the contact; and
responsive to receiving the acceptance from the computing device of the contact, transmitting a recommendation to a computing device of a hiring entity associated with the at least one job.

Clause 6. The method of any preceding clause, further comprising:
determining, via a trained machine learning model, a probability the one or more job matches for each of the plurality of contacts will result in a hiring event.

Clause 7. The method of any preceding clause, wherein determining the one or more job matches for each of the plurality of contacts further comprises:
determining a plurality of job match scores for the plurality of contacts, wherein the determining the plurality of job match scores is based on an occupation selected by the plurality of contacts, an experience selected by the plurality of contacts, a location of a job selected by the plurality of contacts, or some combination thereof.

Clause 8. The method of any preceding clause, wherein determining, using the trained machine learning model, the plurality of referrer scores is based on an occupation, an experience, a location, or some combination thereof.

Clause 9. The method of any preceding clause, further comprising determining, for the platform, a minimum number of job postings, candidates, referrers, or some combination thereof, wherein the determining the minimum number is based on a conversion rate.

Clause 10. A system, comprising:
a computing device of a candidate;
a computing device of a referrer;
a computing device of a hiring entity;
a cloud-based computing system communicatively coupled to the computing device of the candidate, the computing device of the referrer, and the computing device of the hiring entity, wherein the cloud-based computing system executes instructions to:
determine a job match between the candidate and a job posted by the hiring entity;
provide the job match for presentation on the computing device of the referrer;
receive, from the computing device of the referrer, a selection to share the job match with the candidate;
transmit, to the computing device of the candidate, a message comprising the job match and information pertaining to the referrer;
receiving, from the computing device of the candidate, an acceptance for the referrer to recommend the candidate to the hiring entity for the job;
transmit, to the computing device of the hiring entity, a recommendation for the candidate on behalf of the referrer;
receive, from the computing device of the hiring entity, a selection of the candidate to apply for the job, wherein the selection is based on the recommendation; and
transmit, to the computing device of the candidate, an invitation to interview for the job.

Clause 11. The system of any preceding clause, wherein the processing device is configured to determine a referrer score for the referrer, wherein the referrer score is associated with a relationship between the candidate and the referrer, and the referrer score is based on an occupation, an experience, a location of the job, or some combination thereof.

Clause 12. The system of any preceding clause, wherein the processing device is configured to:
perform natural language processing on a corpus of data to determine one or more frequencies one or more keywords are used in the data; and
select, based on the frequency, a portion of the one or more keywords as selections for the occupation, the experience, the location of the job, or some combination thereof.

Clause 13. The system of any preceding clause, wherein the processing device is configured to determine a job match score for the candidate, wherein the referrer score is associated with a relationship between the candidate and the job, and the job match score is based on an occupation, an experience, a location of the job, or some combination thereof.

Clause 14. The system of any preceding clause, wherein the processing device is configured to:
perform natural language processing on a corpus of data to determine one or more frequencies one or more keywords are used in the data; and
select, based on the frequency, a portion of the one or more keywords as selections for the occupation, the experience, the location of the job, or some combination thereof.

Clause 15. The system of any preceding clause, wherein the processing device is configured to use a trained machine learning model to determine the referrer score.

Clause 16. The system of any preceding clause, wherein the processing device is configured to use a trained machine learning model to determine the job match score.

Clause 17. The system of any preceding clause, wherein the processing device is configured to generate, based on one or more sources, a contact center including a plurality of contacts, wherein the one or more sources comprises a social network, a native application executing on the computing device of the candidate, a native application executing on the computing device of the referrer, or some combination thereof.

Clause 18. A method comprising:
receiving, from one or more sources, data pertaining to a referrer, data pertaining to a candidate, and data pertaining to a job;
determining, using a trained machine learning model, a referrer score for the referrer, wherein the referrer score pertains to an ability of the referrer to refer the candidate for the job, and the trained machine learning model uses the data pertaining to the referrer, the data pertaining to the candidate, and the data pertaining to the job as input, and outputs the referrer score;
providing the referrer score for the referrer to a computing device for presentation in conjunction with at least a portion of the data pertaining to the candidate and the job;
receiving, from the computing device, a selection for the referrer to refer the candidate for the job;
transmitting, to the computing device of a hiring entity associated with the job, a recommendation for the candidate on behalf of the referrer;
receive, from the computing device of the hiring entity, a selection of the candidate to apply for the job, wherein the selection is based on the recommendation; and
transmit an invitation to the candidate to interview for the job.

Clause 19. The method of any preceding clause, wherein at least one of the data pertaining to the referrer, the data pertaining to the candidate, and the data pertaining to the job is received in a first format, and the method further comprises:
codifying the first format to a second format compatible with the trained machine learning model, wherein the trained machine learning model outputs the referrer score in the second format to an application or website presented on the computing device.

Clause 20. The method of any preceding clause, wherein at least one of the data pertaining to the referrer, the data pertaining to the candidate, and the data pertaining to the job is received via an application programming interface of a third-party application or website.

The invention claimed is:

1. A method comprising:
connecting, using a platform hosted by a cloud-based computing system, to a plurality of sources using one or more application programming interfaces exposed by the plurality of sources;
transmitting one or more function calls to the one or more application programming interfaces, wherein the one or more function calls request a plurality of contacts;

receiving, at the platform hosted by the cloud-based computing system, the plurality of contacts from the plurality of sources, wherein the plurality of sources comprise a social network, a native application on a computing device of a user, or both, and the plurality of contacts comprise differing data formats;

generating a transformed plurality of contacts by transforming the plurality of contacts from the differing data formats to a standardized format used by one or more machine learning models;

processing the transformed plurality of contacts to generate a contact center including at least a portion of the plurality of contacts;

training, using first training data comprising at least the transformed plurality of contacts, the one or more machine learning models to determine a plurality of job match scores for each of the transformed plurality of contacts, wherein the first training data comprises training inputs comprising candidate information and job posting information mapped to training outputs comprising job match scores in the standardized format;

determining, using the one or more machine learning models, the plurality of job match scores;

determining, based on the plurality of job match scores, one or more job matches for each of the transformed plurality of contacts;

training, using second training data comprising at least the transformed plurality of contacts, the one or more machine learning models to determine a plurality of referrer scores for the user associated with the one or more job matches for each of the transformed plurality of contacts, wherein:

the second training data comprises training inputs comprising candidate information and referrer information mapped to training outputs comprising referrer scores in the standardized format, the one or more machine learning models are continuously retrained to modify one or more coefficient weights associated with codified variables, the coefficient weights control how the codified variables determine the plurality of referrer scores, and the codified variables relate to at least a success of the user referring candidates and the success of the user in the workplace;

determining, using the one or more machine learning models, the plurality of referrer scores for the user associated with the one or more job matches for each of the transformed plurality of contacts;

determining whether the plurality of referrer scores satisfy a threshold score; and responsive to determining the plurality of referrer scores satisfy the threshold score, providing, for presentation on the computing device of the user, the one or more job matches for each of the transformed plurality of contacts.

2. The method of claim 1, further comprising:
receiving, at the platform, a selection to invite a contact to join the platform, wherein the contact is included in the contact center;
transmitting an invitation to a computing device of the contact.

3. The method of claim 1, wherein processing the transformed plurality of contacts comprises merging the transformed plurality of contacts and de-duplicating the transformed plurality of contacts.

4. The method of claim 1, further comprising:
responsive to determining a contact in the contact center is a member of the platform, receiving a selection to refer the contact to a job match of the one or more job matches, wherein the selection causes a notification to be transmitted to a computing device of a hiring entity associated with the job match, the computing device of the contact, or both.

5. The method of claim 1, further comprising:
receiving a selection to be a referrer for a contact of the transformed plurality of contacts matched with at least one job;
transmitting a notification to a computing device of the contact, wherein the notification requests acceptance of the referrer for the contact; and
responsive to receiving the acceptance from the computing device of the contact, transmitting a recommendation to a computing device of a hiring entity associated with the at least one job.

6. The method of claim 1, further comprising:
determining, via a trained machine learning model, a probability the one or more job matches for each of the transformed plurality of contacts will result in a hiring event.

7. The method of claim 1, wherein determining the plurality of job match scores for each of the transformed plurality of contacts, is based on an occupation selected by the transformed plurality of contacts, an experience selected by the transformed plurality of contacts, a location of a job selected by the plurality of contacts, or some combination thereof.

8. The method of claim 1, wherein determining, using the one or more machine learning models, the plurality of referrer scores is based on an occupation, an experience, a location, or some combination thereof.

9. The method of claim 1, further comprising determining, for the platform, a minimum number of job postings, candidates, referrers, or some combination thereof, wherein the determining the minimum number is based on a conversion rate.

10. A system, comprising:
a computing device of a candidate;
a computing device of a referrer;
a computing device of a hiring entity;
a cloud-based computing system communicatively coupled to the computing device of the candidate, the computing device of the referrer, and the computing device of the hiring entity, wherein the cloud-based computing system executes instructions to:
connect, using a platform hosted by the cloud-based computing system, to a plurality of sources using one or more application programming interfaces exposed by the plurality of sources;
transmit one or more function calls to the one or more application programming interfaces, wherein the one or more function calls request a plurality of contacts;
receive the plurality of contacts from the plurality of sources, wherein the plurality of contacts comprise differing data formats;
generating a transformed plurality of contacts by transforming the plurality of contacts from the differing data formats to a standardized format used by one or more machine learning models;
train, using first training data comprising at least the transformed plurality of contacts, the one or more machine learning models to determine a job match score for the candidate, wherein the first training data comprises training inputs comprising candidate information and job posting information mapped to training outputs comprising job match scores in the standardized format;

determine, using the one or more machine learning models, the job match score;

determine, based on the job match score, a job match between the candidate and a job posted by the hiring entity;

train, using second training data comprising at least the transformed plurality of contacts, the one or more machine learning models to determine a referrer score for the referrer, wherein:

the second training data comprises training inputs comprising candidate information and referrer information mapped to training outputs comprising referrer scores in the standardized format, the one or more machine learning models are continuously retrained to modify one or more coefficient weights associated with codified variables, the coefficient weights control how the codified variables determine the plurality of referrer scores, and the codified variables relate to at least a success of the user referring candidates and the success of the user in the workplace;

determine, using the one or more trained machine learning models, the referrer score for the referrer;

determine whether the referrer score satisfies a threshold score;

responsive to determining the referrer score satisfies the threshold score, provide the job match for presentation on the computing device of the referrer;

receive, from the computing device of the referrer, a selection to share the job match with the candidate;

transmit, to the computing device of the candidate, a message comprising the job match and information pertaining to the referrer;

receiving, from the computing device of the candidate, an acceptance for the referrer to recommend the candidate to the hiring entity for the job;

transmit, to the computing device of the hiring entity, a recommendation for the candidate on behalf of the referrer;

receive, from the computing device of the hiring entity, a selection of the candidate to apply for the job, wherein the selection is based on the recommendation; and transmit, to the computing device of the candidate, an invitation to interview for the job.

11. The system of claim 10, wherein the referrer score is associated with a relationship between the candidate and the referrer, and the referrer score is based on an occupation, an experience, a location of the job, or some combination thereof.

12. The system of claim 11, wherein the cloud-based computing system executes instructions to:

perform natural language processing on a corpus of data to determine one or more frequencies one or more keywords are used in the data; and select, based on the frequency, a portion of the one or more keywords as selections for the occupation, the experience, the location of the job, or some combination thereof.

13. The system of claim 10, wherein the job match score is associated with a relationship between the candidate and the job, and the job match score is based on an occupation, an experience, a location of the job, or some combination thereof.

14. The system of claim 13, wherein the cloud-based computing system executes instructions to:

perform natural language processing on a corpus of data to determine one or more frequencies one or more keywords are used in the data; and select, based on the frequency, a portion of the one or more keywords as selections for the occupation, the experience, the location of the job, or some combination thereof.

15. The system of claim 11, wherein the cloud-based computing system is configured to generate a contact center based on the transformed plurality of contacts.

16. The system of claim 10, wherein the cloud-based computing system is configured to generate, based on the one or more sources, a contact center including the transformed plurality of contacts, wherein the one or more sources comprises a social network, a native application executing on the computing device of the candidate, a native application executing on the computing device of the referrer, or some combination thereof.

17. A method comprising:

connecting, using a platform hosted by a cloud-based computing system, to one or more sources using one or more application programming interfaces exposed by the one or more sources;

transmitting one or more function calls to the one or more application programming interfaces, wherein the one or more function calls request aggregate data;

receiving, from the one or more sources, the aggregate data comprising data pertaining to a referrer, data pertaining to a candidate, and data pertaining to a job, wherein the aggregate data comprises differing formats;

generating a transformed data by transforming the aggregate data from the differing data formats to a standardized format used by one or more machine learning models;

training, using first training data comprising at least the transformed data, the one or more machine learning models to determine a job match score for the candidate and the job, wherein the first training data comprises training inputs comprising candidate information and job posting information mapped to training outputs comprising job match scores in the standardized format;

determining, using the one or more machine learning models, the job match score;

determining, based on the job match score, a job match for the candidate and the job;

training, using second training data comprising at least the transformed data, the one or more machine learning models to determine a referrer score for the referrer, wherein:

the second training data comprises training inputs comprising candidate information and referrer information mapped to training outputs comprising referrer scores in the standardized format, the one or more machine learning models are continuously retrained to modify one or more coefficient weights associated with codified variables, the coefficient weights control how the codified variables determine the plurality of referrer scores, and the codified variables relate to at least a success of the user referring candidates and the success of the user in the workplace;

determining, using the one or more machine learning models, the referrer score for the referrer, wherein the referrer score pertains to an ability of the referrer to refer the candidate for the job;

determining whether the referrer score satisfies a threshold score;

responsive to determining the referrer score satisfies the threshold score, providing the referrer score for the referrer to a computing device for presentation in conjunction with at least a portion of the data pertaining to the candidate and the job;

receiving, from a computing device, a selection for the referrer to refer the candidate for the job;

transmitting, to the computing device of a hiring entity associated with the job, a recommendation for the candidate on behalf of the referrer;

receive, from the computing device of the hiring entity, a selection of the candidate to apply for the job, wherein the selection is based on the recommendation; and transmit an invitation to the candidate to interview for the job.

18. The method of claim 17, wherein at least one of the data pertaining to the referrer, the data pertaining to the candidate, and the data pertaining to the job is received via an application programming interface of a third-party application or website.

* * * * *